US010899991B2

(12) United States Patent
Atkins et al.

(10) Patent No.: US 10,899,991 B2
(45) Date of Patent: Jan. 26, 2021

(54) PROCESS FOR THE PREPARATION OF A LUBRICANT BASE STOCK COMPRISING THE SELECTIVE THERMAL DECOMPOSITION OF PLASTIC POLYOLEFIN POLYMER

(71) Applicant: Trifol Resources Limited, Naas (IE)

(72) Inventors: Martin P. Atkins, Antrim (GB); Fergal Coleman, Antrim (GB)

(73) Assignee: Trifol Resources Limited, Naas (IE)

( * ) Notice: Subject to any disclaimer, the term of this patent is extended or adjusted under 35 U.S.C. 154(b) by 0 days.

(21) Appl. No.: 15/559,466

(22) PCT Filed: Mar. 30, 2017

(86) PCT No.: PCT/GB2017/050907
§ 371 (c)(1),
(2) Date: Dec. 26, 2018

(87) PCT Pub. No.: WO2017/168164
PCT Pub. Date: Oct. 5, 2017

(65) Prior Publication Data
US 2019/0177652 A1    Jun. 13, 2019

(30) Foreign Application Priority Data
Mar. 31, 2016 (GB) .................................. 1605528.7

(51) Int. Cl.
*C10M 177/00*    (2006.01)
*C10B 53/07*    (2006.01)
(Continued)

(52) U.S. Cl.
CPC .......... *C10M 177/00* (2013.01); *C10B 53/07* (2013.01); *C10G 1/10* (2013.01); *C10G 47/16* (2013.01);
(Continued)

(58) Field of Classification Search
CPC .......... C10B 53/07; C10B 27/06; C10G 1/10; C10G 2400/22
See application file for complete search history.

(56) References Cited

U.S. PATENT DOCUMENTS 4,740,270 A    4/1988 Roy
5,292,862 A *  3/1994 Miura .................. B01J 19/2415
                                                    528/481
(Continued)

FOREIGN PATENT DOCUMENTS

CN    102504330    6/2012
DE    4336317    4/1995
(Continued)

OTHER PUBLICATIONS

Miranda, R. et al. (2001) Polymer Degradation and Stability, 73, 47-67.*
(Continued)

*Primary Examiner* — Brian A McCaig
(74) *Attorney, Agent, or Firm* — Ryan T. Grace; Advent, LLP

(57) ABSTRACT

The present invention relates to a process for the preparation of a lubricant base stock from the thermal decomposition of plastic polymer. The present invention provides a process for preparing a lubricant base stock from the thermal decomposition of plastic polyolefin polymer, the method comprising the steps of:
i) introducing plastic polyolefin polymer into a thermal reaction zone of a vacuum pyrolysis reactor;
ii) heating the plastic polyolefin polymer at sub-atmospheric pressure, wherein the temperature in the thermal reaction zone of the reactor is from 500° C. to 750° C., to induce thermal decomposition of the plastic polyolefin polymer and to form a thermal decomposi-
(Continued)

Figure 1:
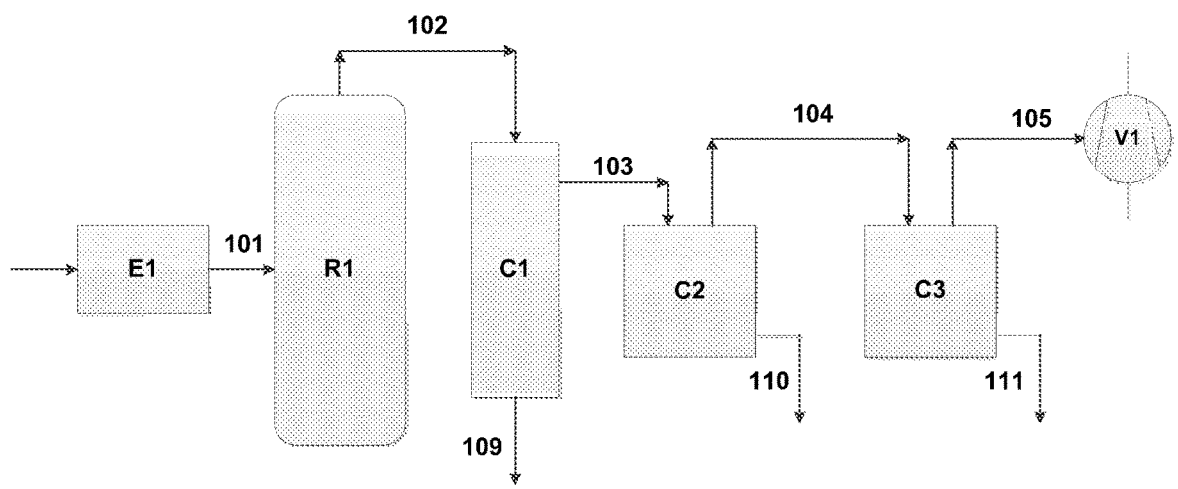

tion product effluent which comprises a major portion by weight of a $C_{20}$ to $C_{60}$ wax fraction;

iii) condensing a vapour component of the thermal decomposition product effluent from the vacuum pyrolysis reactor; and iv) subjecting the $C_{20}$ to $C_{60}$ wax fraction of the thermal decomposition product to catalytic hydroisomerization in a hydroisomerization reactor in the presence of hydrogen to form the lubricant base stock;

wherein the plastic polyolefin polymer comprises polyethylene and polypropylene in a polyethylene to polypropylene weight ratio of from 60:40 to 90:10.

20 Claims, 6 Drawing Sheets

(51) Int. Cl.

| | | |
|---|---|---|
| *C10G 1/10* | (2006.01) | |
| *C10G 47/16* | (2006.01) | |
| *C10M 101/02* | (2006.01) | |
| *C10N 20/02* | (2006.01) | |
| *C08J 11/12* | (2006.01) | |

(52) U.S. Cl.
CPC ............ *C10M 101/02* (2013.01); *C08J 11/12* (2013.01); *C08J 2323/06* (2013.01); *C08J 2323/12* (2013.01); *C10G 2300/1003* (2013.01); *C10G 2300/1085* (2013.01); *C10G 2400/10* (2013.01); *C10N 2020/02* (2013.01); *Y02P 20/143* (2015.11)

(56) References Cited

U.S. PATENT DOCUMENTS

| | | | |
|---|---|---|---|
| 6,143,940 A | 11/2000 | Miller et al. | |
| 6,150,577 A | 11/2000 | Miller et al. | |
| 8,088,961 B2 * | 1/2012 | Miller | ................ G10M 171/00 |
| | | | 585/241 |
| 8,420,875 B1 * | 4/2013 | Mackay | .................... C07C 4/04 |
| | | | 585/241 |
| 9,365,775 B1 | 6/2016 | La Crosse et al. | |
| 2009/0170739 A1 | 7/2009 | Miller | |

FOREIGN PATENT DOCUMENTS

| | | |
|---|---|---|
| DE | 4423394 | 3/1996 |
| DE | 4430665 | 3/1996 |
| DE | 19512029 | 11/1996 |
| GB | 2388842 | 11/2003 |
| WO | 2010049824 | 5/2010 |
| WO | 20140125345 | 8/2014 |

OTHER PUBLICATIONS

Miranda, R. et al. (1999) Polymer Degradation and Stability, 64, 127-144.*

Mousa, S. et al. (2013) Journal of Chemistry, Hindawi Publishing Corp., Article ID 487676, 5 pgs.*

Notification of Transmittal of the International Search Report and the Written Opinion of the International Searching Authority—dated Jun. 7, 2017.

GB Search Report dated Sep. 21, 2016.

GB Search Report dated Aug. 17, 2017.

* cited by examiner

PROCESS FOR THE PREPARATION OF A LUBRICANT BASE STOCK COMPRISING THE SELECTIVE THERMAL DECOMPOSITION OF PLASTIC POLYOLEFIN POLYMER

The present invention relates to a process for the preparation of a lubricant base stock from the thermal decomposition of plastic polymer. In particular, the present invention corresponds to a vacuum pyrolysis process which is operated under conditions favourable for the formation of a $C_{20}$ to $C_{60}$ wax from a plastic polyolefin polymer feed having a weight ratio of polyethylene to polypropylene of from 60:40 to 90:10 that is in turn converted to a lubricant base stock by hydroisomerization.

Lubricant base stocks used in automotive engine lubricants are generally obtained from petrochemical sources. For example, lubricant base stocks may be obtained as higher boiling fractions isolated during refining of crude oil or as the products of chemical reactions of feedstocks from petrochemical sources. Lubricant base stocks may also be made from the conversion of Fischer-Tropsch wax.

Lubricant base stocks may be classified as Group I, II, III, IV and V base stocks according to API standard 1509, "ENGINE OIL LICENSING AND CERTIFICATION SYSTEM", September 2012 version 17th edition Appendix E, as set out in Table 1.

TABLE 1

| Group | Saturated hydrocarbon content (% by weight) ASTM D2007 | Sulphur content (% by weight) ASTM D2622 or D4294 or D4927 or D3120 | | Viscosity Index ASTM D2270 |
|---|---|---|---|---|
| I | <90 | and/or | >0.03 and | ≥80 and <120 |
| II | ≥90 | and | ≤0.03 and | ≥80 and <120 |
| III | ≥90 | and | ≤0.03 and | ≥120 |
| IV | | polyalphaolefins | | |
| V | | all base stocks not in Groups I, II, III or IV | | |

Group I, Group II and Group III base stocks are generally derived from mineral oils. Group I base stocks are typically manufactured by known processes comprising solvent extraction and solvent dewaxing, or solvent extraction and catalytic dewaxing. Group II and Group III base stocks are typically manufactured by known processes comprising catalytic hydrogenation and/or catalytic hydrocracking, and catalytic hydroisomerization. Group IV base stocks include for example, hydrogenated oligomers of alpha olefins. Suitable processes for the preparation of the oligomers include for example, free radical processes, Zeigler catalysed processes and cationic Friedel-Crafts catalysed processes. Suitably, polyalphaolefin base stocks are derived for example from $C_8$, $C_{10}$, $C_{12}$, $C_{14}$ olefins and mixtures of one or more thereof.

In recent years, there has been an increased focus on identifying sustainable replacements for products that have historically been obtained from fossil sources. Furthermore, as performance requirements for lubricants have become more stringent, there has been increasing demand for Group III base stocks as a result of their desirable properties, such as high viscosity index. However, Group III base stocks are typically more expensive to produce than either Group I or Group II bases stocks. One source which can play an important role in future lubricant formulations is that of waste or used plastic.

As levels of waste plastic continue to rise globally, there has become an increasing focus on plastics recycling solutions as an alternative to landfill. Plastic recycling has historically been focussed on producing fuel oil and gas products, although conversion of waste plastics into waxes, lubricant base stocks and grease base stocks is also possible. Given the surplus of waste plastic that continues to be generated, waste or used plastic can represent a cheap and readily accessible feedstock from which to prepare a lubricant base stock and even a Group III base stock.

Pyrolysis has emerged as a means for converting waste plastic into wax and other higher value decomposition products. Pyrolysis is a well-known thermochemical decomposition process which occurs in the absence of oxygen. Historically, pyrolysis has been used as a means for conversion of organic material into higher value decomposition products. Common examples include conversion of lignocellulosic biomass into bio-oil and the recycling of used rubber tyres into fuel oil and gas products.

A number of different processes and reactor designs have been investigated for the pyrolysis of waste plastics, including processes utilising melting vessels, blast furnaces, autoclaves, tube reactors, rotary kilns, cooking chambers and fluidized bed reactors. Much of the focus regarding waste plastics pyrolysis has been directed to fluidised bed processes. Fluidized bed reactors have been popular as they provide rapid heat transfer, good control for pyrolysis reaction and vapour residence time, extensive high surface area contact between fluid and solid per unit bed volume, good thermal transport inside the system and high relative velocity between the fluid and solid phase, as well as an ease of use. For these reasons, fluidized-bed reactors can also be operated so as to provide so called "fast pyrolysis" conditions, characterised by very high heating and heat transfer rates and low vapour residence times in the thermal decomposition zone of the pyrolysis reactor which is intended to minimise secondary cracking reactions in the reactor.

EP 0502618 discloses a process for pyrolysing polyolefins in a fluidised bed of particulate material (e.g. quartz sand) and with a fluidising gas at a temperature of from 300 to 690° C., preferably without a catalyst and at atmospheric pressure. The pyrolysis products comprise lower hydrocarbons, preferably in the range of around $C_7$ to $C_{70}$. EP 0 567 292 relates to a similar fluidised bed process but is conducted at higher pressures and in the presence of an acidic catalyst such as an alumina or zeolite catalyst.

EP 0577279 discloses the use of a toroidal fluidised bed reactor in place of a conventional fluidised bed. A larger size range of particulate bed materials can be used with this process and low residence times can be implemented. At 350° C., in a bed of alumina, a mixture of hydrocarbons was formed by pyrolysis of polyethylene, mainly having 30 to 40 carbon atoms. At 500° C., and using a zirconia bed, the result was mainly 40 to 80 carbon atoms.

EP 0687692 discloses another fluidised bed process with the addition of "guard beds" comprising CaO to remove HCl from the product before further processing. This process can be used with "mixed waste plastic" which includes, for instance, PVC. Pre-conditioning can include heating at 250 to 450° C. in a stirred tank or extruder. It is also disclosed to introduce liquid (molten) hydrocarbons (from the fluidised bed, or refinery streams) to the feedstock in order to further crack these hydrocarbons and to reduce viscosity/improve heat transfer.

EP 0620264 discloses a fluidized-bed pyrolysis process, wherein a wax product is subsequently hydrotreated to remove double-bonds and heteroatoms after pyrolysis, before being isomerised and fractionated to give a lubricating oil.

Other processes for conversion of waste plastics have focussed on catalytic depolymerisation, an example of which is disclosed in WO 2014/110664. In that process, a pre-heated molten polymeric material, such as polyethylene, is heated in a high pressure reactor in the presence of [Fe—Cu—Mo—P]/$Al_2O_3$ catalyst in order to produce the desired wax product.

DE 100 13 466 discloses a process for recovery of high molecular weight polyolefin decomposition wax from recycled plastics. In that process, waste plastics are melted at temperatures ranging from 350° C. to 390° C. before the melted plastic is thermally decomposed at temperatures up to 450° C. in the absence of oxygen. Distillation, preferably under vacuum, is then undertaken to isolate the desired high molecular weight fraction. This document teaches the use of melting followed by pyrolysis at temperatures of up to a maximum of 450° C. and under the pressure generated by the reaction. There is no suggestion of reducing the pressure at which pyrolysis is conducted in this document. However, such a reduction would also be expected to reduce the heating requirement of the pyrolysis reaction in order to achieve the same level of cracking, since the boiling point of the polyolefin material is reduced at lower pressure.

An alternative pyrolysis process that has been used in connection with the thermal decomposition of biomass is vacuum pyrolysis. This process obviates the use of a carrier gas which is required in other pyrolysis processes. Carrier gas can entrain fine char particles produced from decomposition of biomass in the reactor, which are subsequently collected with the oil when it condenses; impacting negatively upon bio-oil quality. Vacuum pyrolysis can therefore help improve bio-oil quality by reducing entrainment of fine char particles. The vacuum pyrolysis process can also accommodate larger feed particles than conventional fluidized bed processes.

The heat transfer rates in vacuum pyrolysis are typically lower compared with fluidised bed processes and other pyrolysis technologies and on this basis vacuum pyrolysis is generally considered to correspond to a so called "slow pyrolysis" process, characterised by relatively slow heating rates (approximately 0.1-1° C./s) as opposed to a so called "fast pyrolysis" process characterised by fast heating rates (approximately 10-200° C./s). Nevertheless, the produced pyrolysis vapours are quickly removed from the vacuum pyrolysis reactor as a result of the vacuum, thereby reducing secondary cracking reactions. Consequently, vacuum pyrolysis may also be considered to simulate a "fast pyrolysis" process at least to this extent. Such a process is, for example, disclosed in CA 1,163,595 which describes vacuum pyrolysis of lignocellulosic materials to afford organic products and liquid fuels. An overview of fast pyrolysis of biomass is also provided in Bridgewater A. V. et al., Organic Geochemistry, 30, 1999, pages 1479 to 1493.

There remains a need for alternative pyrolysis processes which are advantageous for the thermal decomposition of waste plastic, especially where a wax pyrolysis product can be prepared in high yield which may subsequently be converted into a lubricant base stock.

It has now been found that the simulated fast pyrolysis conditions of vacuum pyrolysis may be applied advantageously to the selective thermal decomposition of waste plastic for production of a $C_{20}$ to $C_{60}$ wax fraction, which may in turn be conveniently converted into a lubricant base stock. In particular, the present invention utilises a vacuum pyrolysis process conducted with a plastic polyolefin polymer feed having a weight ratio of polyethylene to polypropylene of from 60:40 to 90:10, the combination of which has been found to maximise the yield of the $C_{20}$ to $C_{60}$ wax and confer advantageous properties on the wax obtained, making it particularly suitable for subsequent conversion into a lubricant base stock. Numerous additional advantages of the process of the present invention will be apparent from the below disclosure.

By employing a vacuum pyrolysis process in the thermal decomposition of plastic polymer in accordance with the present invention, rather than a conventional high-pressure fluidized-bed pyrolysis process, it is possible to obtain $C_{20}$ to $C_{60}$ wax of particularly desirable composition and in good yield. The process of the invention may be used to obtain a synthetic wax which is particularly advantageous as far as downstream processing for conversion to a lubricant base stock is concerned.

A benefit of the present invention is that it simulates a fast pyrolysis process so as to minimise secondary cracking reactions in the pyrolysis reactor, which has been found to be beneficial for maximising $C_{20}$ to $C_{60}$ wax yield, yet does not have the energy demand associated with the relatively high heating rates utilised, for instance, in fluidized-bed fast pyrolysis processes. In other words, the present invention can represent an economical solution to obtaining a selective thermal decomposition of plastic polymer so as to produce a high value wax pyrolysis product in good yield. The process of the present invention does not require the use of a catalyst, a carrier gas or a fluidized-bed which typically requires intermittent regeneration, maintenance and repair to maintain adequate functionality.

The $C_{20}$ to $C_{60}$ wax obtained from the pyrolysis comprises a mixture of paraffins, including isoparaffins, and olefins which require dewaxing modifications so as to produce a lubricant base stock. However, because the source of the wax is a plastics feed, a wax may be obtained which is substantially free of heteroatoms. Consequently, a hydrotreatment which is usually necessary for removal of heteroatoms may be made much less onerous or completely obviated as part of preparing a lubricant base stock in accordance with the present invention.

Moreover, the presence of polypropylene at the above weight ratio ensures that decomposition products obtained in the pyrolysis reaction include branching, which has a significant effect on the physical properties of the wax obtained and benefits the subsequent conversion to a lubricant base stock by hydroisomerization.

Thus, in one aspect the present invention provides a process for preparing a lubricant base stock from the thermal decomposition of plastic polyolefin polymer, the method comprising the steps of:
  i) introducing plastic polyolefin polymer into a thermal reaction zone of a vacuum pyrolysis reactor;
  ii) heating the plastic polyolefin polymer at sub-atmospheric pressure, wherein the temperature in the thermal reaction zone of the reactor is from 500° C. to 750° C., to induce thermal decomposition of the plastic polyolefin polymer and to form a thermal decomposition product effluent which comprises a major portion by weight of a $C_{20}$ to $C_{60}$ wax fraction;
  iii) condensing a vapour component of the thermal decomposition product effluent from the vacuum pyrolysis reactor; and iv) subjecting the $C_{20}$ to $C_{60}$ wax fraction of the thermal decomposition product to catalytic hydroisomerization in a hydroisomerization reactor in the presence of hydrogen from the lubricant base stock;

wherein the plastic polyolefin polymer comprises polyethylene and polypropylene in a polyethylene to polypropylene weight ratio of from 60:40 to 90:10.

A plastic polyolefin polymer is employed for thermal decomposition in accordance with the present invention which comprises polyethylene and polypropylene in the above weight ratio. In some embodiments other plastic polyolefin polymers may additionally be present in minor proportion of less than 15 wt % based on the blend, preferably less than 10 wt % based on the blend. Examples of additional plastic polyolefin polymers include polymethylpentene (PMP), polybutene-1 (PB-1), as well as copolymers thereof. However, in preferred embodiments, the plastic polyolefin polymer consists essentially of polyethylene and polypropylene.

Preferably, the plastic polyolefin polymer employed as the feed in accordance with the present invention comprises or consists essentially of used or waste plastic. Nevertheless, in some embodiments the plastic polyolefin polymer employed as the feed may include virgin plastic, or may even consist essentially of virgin plastic.

In addition to polyolefins, common sources of waste plastic material include: aromatic plastic polymers, for example polystyrene; halogenated plastic polymers, for example polyvinyl chloride and polytetraflouroethylene; and polyester plastic polymers, for example polyethylene terephthalate. It is preferred that these plastic polymers are kept to a minimum in the feed which is subjected to pyrolysis in the process of the present invention. The presence of appreciable quantities of these polymers can complicate system design and feasibility. For example, these polymers can lead to gum formation necessitating regular reactor shut-down and cleaning steps to be implemented. Halogenated polymers also give rise to the formation of haloacids following pyrolysis which can lead to significant corrosion problems unless steps are taken to neutralise or otherwise trap the acid byproducts.

Thus, in preferred embodiments, the feed to the pyrolysis reactor comprises less than 1.0 wt. %, preferably less than 0.1 wt. %, of combined aromatic, halogenated and polyester polymers. Most preferably, the feed to the pyrolysis reactor comprises substantially no aromatic, halogenated and polyester polymers. Where used or waste plastic is used as the source of the plastic polyolefin polymer utilized in the present invention, it will be appreciated that sorting processes are available to substantially eliminate contamination of the waste polyolefin plastic.

The plastic polyolefin polymer used in accordance with the present invention may comprise polyethylene in the form of high-density polyethylene (HDPE), low-density polyethylene (LDPE), linear low density polyethylene (LLDPE) or mixtures thereof.

The plastic polyolefin polymer used in accordance with the present invention may comprise polypropylene in the form of high-density polypropylene (HDPP), low-density polypropylene (LDPP) or mixtures thereof.

In preferred embodiments, the plastic polyolefin polymer comprises polyethylene and polypropylene in an amount of at least 90 wt. %, more preferably at least 95 wt. %, most preferably at least 97 wt. %.

In particularly preferred embodiments, the weight ratio of polyethylene to polypropylene is from 65:35 to 85:15, more preferably from 73:30 to 80:20. It is has been found that a particularly desirable wax may be produced by the vacuum pyrolysis process of the present invention when the plastic polymer feed comprises polyethylene and polypropylene in the weight ratios described herein. In particular, these preferred ratios have been found to afford a wax with particularly favourable properties including melting, congealing, and drop points, as well as favourable viscosity, density, and needle penetration, as compared to other polymer mixtures, including mixtures of polyethylene and polypropylene which do not have these weight ratios.

In order to improve lubricant properties, including for example reducing pour point and increasing viscosity index, isomerization is typically included to introduce branching. The presence of branching in the wax product of the thermal decomposition (derived from the presence of polypropylene in the above described ratio in the plastic polyolefin polymer feed) can make the downstream isomerization step less onerous or energy intensive. For example, an isomerization catalyst which has high selectivity for n-paraffins, meaning that there is preference for isomerization of the portion of the wax which requires it, may be advantageously used under energetically favourable conditions which would not be sufficient for the effective conversion of other waxes not containing branching (for example polyethylene or Fischer-Tropsch derived waxes) to lubricant base stocks.

In addition, it has been surprisingly found that increasing pyrolysis temperature has a greater effect on the proportion of $C_{20}$-$C_{60}$ wax produced for polypropylene and polyethylene/polypropylene mixed feeds than for a pure polyethylene polymer feed. In particular, increasing pyrolysis temperature, for instance at 500° C. and above, can lead to a greater increase in the yield of $C_{20}$-$C_{60}$ wax for a pure polypropylene or mixed polyethylene/polypropylene feed than when compared to the effect of the same pyrolysis temperature increase in the case of pure polyethylene feed. Thus, by using a mixed feed comprising polypropylene and polyethylene, the benefits of operating the pyrolysis at high temperature, for example temperatures above 500° C., in terms of the $C_{20}$-$C_{60}$ fraction yield may be obtained whilst also at the same time retaining the benefits of including some branching in the waxes, as discussed hereinbefore. Thus, for producing waxes with desirable properties, the synergy between the use of a certain proportion of polypropylene in the feed, particularly in the ranges described hereinbefore, and the use of higher pyrolysis temperatures can be particularly advantageous.

In order to obtain a plastic polyolefin polymer of the desired composition, in preferred embodiments, an optical sorting process is used to select the plastic polyolefin polymer constituents and their relative proportions in the polymer feed. Following intermediate sorting processes which, for instance, separate different plastics based on density or differential buoyancy in air to produce intermediate streams, optical sorting may subsequently be used to further sort the components of a single intermediate stream. Optical sorting is a convenient means for ensuring that the desired ratio of polyethylene to polypropylene in the plastic polyolefin polymer fed to the pyrolysis reactor is maintained in the preferred embodiments of the invention. Optical sorting technologies include near-Infrared (NIR) absorption spectroscopy, camera color sorters and X-ray fluorescence, as for instance described in US 2014/0209514 and U.S. Pat. No. 5,134,291.

In step i) of the process of the invention, the plastic polyolefin polymer is supplied to the thermal reaction zone of the vacuum pyrolysis reactor. The plastic polyolefin polymer may be supplied to the pyrolysis reactor in any form tolerated by the pyrolysis reactor. For example, where the plastic polyolefin polymer is supplied in solid form, this may suitably be in flaked, pelletized or granular form. However, it is preferred that the plastic polyolefin polymer is supplied to the pyrolysis reactor in molten form following a pre-heating step.

The plastic polyolefin polymer may be introduced into the pyrolysis reactor by any suitable means, although preferably a means which is compatible with supplying a vacuum pyrolysis reactor during operation under sub-atmospheric conditions, potentially on a continuous basis. In preferred embodiments, an extruder is used for feeding the plastic polyolefin polymer to the pyrolysis reactor. Examples of suitable extruders include single or twin screw type, although single screw is preferred. Where the plastic polyolefin polymer is supplied to the pyrolysis reactor in molten form, the extruder may be heated such that the plastic is melted during extrusion.

Thus, in the process of the present invention plastic polyolefin polymer may be supplied to the extruder from a hopper, for instance in flaked, pelletized or granular form, after which it comes into contact with the rotating screw which forces the plastic polyolefin polymer along the barrel of the extruder, which in preferred embodiments is heated. The plastic polyoefin polymer is subsequently forced through a feed pipe connected to the inlet of the pyrolysis reactor which allows the extruded plastic to be introduced to the thermal reaction zone of the reactor. In preferred embodiments, the extruder is connected to the pyrolysis reactor via a shut-off valve which intermittently allows feed to enter.

The reactor used in the process of the present invention is a vacuum pyrolysis reactor, which may be of any suitable form provided it may be operated under sub-atmospheric conditions. As will be appreciated by the skilled person, operating at a vacuum requires certain feed and discharge configurations in order to maintain a good seal at all times, which configurations, and the associated design implications, are well known to the skilled person.

Examples include simple furnace, tank, stirred tank or tube reactors (depending on the scale of the process), as well as moving bed vacuum pyrolysis reactors or stirred bed vacuum pyrolysis reactors. As will be appreciated by the skilled person, stirred tank, moving and stirred bed configurations complicate reactor design and increase capital costs associated with the pyrolysis process. Consequently, simple tank reactors may be preferred from a cost perspective.

Vacuum conditions can be used to decrease the boiling point of components subjected to heating and therefore the vacuum pyrolysis can reduce the heating duty that would otherwise be required for thermal decomposition of the plastic polyolefin polymer. It has been surprisingly found that the nature of the thermal decomposition in the vacuum pyrolysis process of the present invention favours the formation of $C_{20}$ to $C_{60}$ wax. This is believed to be a consequence of the relatively slow heat transfer conditions and short vapour residence times in the reactor associated with the vacuum pyrolysis of the present invention, as well as the composition of the plastic polyolefin polymer feed which has been found to enhance $C_{20}$ to $C_{60}$ wax yield and the advantageous properties of the wax obtained. These properties include the particular olefin versus paraffin content of the wax produced in step ii) of the process of the present invention, as well as other compositional traits resulting from the extent of cracking reactions occurring in the pyrolysis reactor.

Any suitable temperature and pressure combination may be utilized in the process of the invention in order to produce a $C_{20}$ to $C_{60}$ wax, provided that it is sufficient for thermal decomposition of the polyolefin plastic polymer to produce pyrolysis vapours. The skilled person is able to select suitable temperatures and sub-atmospheric pressures as necessary. For instance, the skilled person will appreciate that at lower pressures, there is a lower heating duty for thermal decomposition, such that lower temperatures in the thermal reaction zone of the pyrolysis reactor are required. Conversely, where higher pressures are used, correspondingly higher temperatures may be required for adequate thermal decomposition over a reasonable timeframe.

Any suitable means for heating the vacuum pyrolysis reactor of which the person of skill in the art is aware may be used in connection with the process of the present invention, for example a burner and/or an induction heater Suitably, the temperature within the thermal reaction zone of the vacuum pyrolysis reactor is from 500° C. to 750° C. Preferably the temperature within the thermal reaction zone of the vacuum pyrolysis reactor is from 500° C. to 650° C., more preferably 525° C. to 650° C., even more preferably from 550° C. to 650° C., for example from 575° C. to 625° C.

In other examples, the temperature in the thermal reaction zone of the vacuum pyrolysis reactor is greater than 500° C., for example greater than 525° C. or greater than 550° C. In other examples, the temperature in the thermal reaction zone of the vacuum pyrolysis reactor is less than 750° C., for example less than 725° C. or less than 700° C.

Suitable pressures within the thermal reaction zone of the vacuum pyrolysis reactor are less than 75 kPa absolute. Preferably, the pressure within the thermal reaction zone of the vacuum pyrolysis reactor is less than 50 kPa absolute, more preferably less than 30 kPa absolute.

It has been found that, by reducing the pressure in the thermal decomposition zone of the pyrolysis reactor, pyrolysis vapour residence time decreases. As a result, fewer secondary cracking reactions are observed and the distribution of constituents of the thermal decomposition product shifts to higher carbon numbers. Similarly, it has also been that, by increasing the temperature in the thermal decomposition zone of the pyrolysis reactor, the distribution of constituents of the thermal decomposition product shifts to higher carbon numbers. This is a consequence of an increase in the volatility of higher boiling (higher carbon number) components inside the pyrolysis reactor as the pyrolysis temperature increases coupled with the low vapour residence time in the pyrolysis reactor, which minimises secondary cracking reactions associated with these higher boiling point components.

The thermal decomposition product effluent produced in accordance with the present invention comprises a vapour component and in some embodiments may consist solely of a vapour component. Nevertheless, as the process of the present invention reduces secondary cracking reactions during the pyrolysis, the products of primary cracking reactions, for instance, may be liquids under the conditions of the pyrolysis. However, such liquid products may be entrained as part of an aerosol (e.g. a mist or a fog) within the pyrolysis vapours, or otherwise mobilized by the pyrolysis vapours, and therefore may be swept out of the pyrolysis reactor along with the pyrolysis vapours by the vacuum. Thus, where reference is made herein to the residence time of pyrolysis vapours in the thermal reaction zone of the reactor, this is also intended to refer to the residence time of an aerosol of liquid thermal decomposition product entrained within pyrolysis vapours, or any other association of liquid thermal decomposition product and pyrolysis vapours where pyrolysis vapours assist in mobilizing liquid thermal decomposition product out of the reactor.

In preferred embodiments, the temperature within the thermal reaction zone of the vacuum pyrolysis reactor is from 600° C. to 750° C. and the pressure within the thermal reaction zone of the vacuum pyrolysis reactor is less than 50 kPa absolute.

In preferred embodiments, the temperature within the thermal reaction zone of the vacuum pyrolysis reactor is from 500° C. to 750° C. and the pressure within the thermal reaction zone of the vacuum pyrolysis reactor is less than 30 kPa absolute.

In preferred embodiments, the temperature within the thermal reaction zone of the vacuum pyrolysis reactor is from 500° C. to 750° C. and the pressure within the thermal reaction zone of the vacuum pyrolysis reactor is less than 10 kPa absolute.

Under these preferred pyrolysis conditions, it is has been found that the process of the present invention is particularly advantageous in terms of the yield and quality of the $C_{20}$ to $C_{60}$ wax fraction that may be produced. In this case, the residence time of the pyrolysis vapours in the thermal decomposition zone of the reactor is particularly short (for example, 1 to 5 seconds). As the skilled person will appreciate, vapour residence time in a vacuum pyrolysis reactor may be determined from knowledge of the rate constant for the pyrolysis reaction and based on gas flow meter measurements at the reactor outlet. The benefits of operating under these conditions may also be enhanced when a multistage condensation is used which preferably includes only two or three condensation stages connected in series having successively lower temperature, discussed in more detail below.

In step iii) of the process, pyrolysis vapours produced in the pyrolysis reactor are condensed to afford the condensed product of the pyrolysis reaction. Any suitable condensation set-up of which the skilled person is aware may be used for condensing the vapour component of the pyrolysis effluent. Examples of suitable condensation units include liquid-cooled surface condensers, which may be operated in transverse, parallel or counter flow. Other condensation units include quench units, for example a demister quench unit or quench tower, which may in some embodiments be operated with a direct liquid quench in which a liquid coolant contacts the thermal decomposition product directly. Suitable coolant liquids for this purpose include liquid propane and supercritical carbon dioxide. When a direct liquid quench is used, the coolant liquid may be conveniently separated from the thermal decomposition product by lowering pressure to boil off the coolant, which may then be captured for recycle.

In preferred embodiments, the vapour component of the pyrolysis effluent is condensed in a multistage condensation comprising a plurality of condensation stages connected in series. It has been found that the effect of reducing secondary cracking reactions is also enhanced when a multistage condensation immediately follows the pyrolysis step. The multistage condensation has been found to provide an efficient cooling gradient over the plurality of connected condensation stages, which set-up has been found to be particularly suited to a fast flow of vapours, as in the case of vacuum pyrolysis. The multistage condensation provides effective cooling and condensing of pyrolysis vapours whilst reducing the overall refrigeration power demand associated with the use of only a single condensation unit.

This benefit is believed to be because there is more efficient cooling and condensing of the pyrolysis vapours over the cooling gradient established by the series of condensation stages than, for instance, in the case where only a single condensation unit is utilised. The pyrolysis vapours flow relatively quickly through the system, as would be expected in the case of a fast pyrolysis process, as a result of the vacuum. The presence of a plurality of condensation stages has been found to be particularly suited for cooling the fast flowing vapours and enhancing the beneficial effects of the pyrolysis in terms of composition and yield of the wax product.

It has also been found that at higher pyrolysis temperatures, for example temperatures of 500° C. and above, that, while an increased proportion of $C_{20}$-$C_{60}$ waxes is produced, at the same time a larger proportion of lighter (below around $C_{10}$) hydrocarbons is also produced. By providing a multistage condensation in combination with a higher pyrolysis temperature, e.g. 500° C. to 750° C., improved separation of this increased lighter fraction from the desired heavy wax fraction can be achieved in comparison to a single stage condensation. Therefore, the use of the combination of higher pyrolysis temperatures and multistage condensation for the production and separation of the desirable wax fractions provides synergistic effects in terms of yield of the desired $C_{20}$-$C_{60}$ wax fraction. It will be understood that convenient separation of lighter fractions during condensation may simplify or eliminate any downstream distillation requirements.

Reference to a multistage condensation is intended to refer to condensation in which at least two separate condensation stages connected in series are utilised, and where each condensation stage in the series is operated at successively lower temperature (i.e. coolant temperature is lowest at the final condensation stage).

The multistage condensation includes at least two condensation stages connected in series which operate at successively lower temperatures. Preferably, the first condensation stage, which is closest to the pyrolysis reactor, includes a collection vessel for holding condensate formed in the first condensation stage. Alternatively, the first condensation stage may be configured such that liquid condensate as well as residual pyrolysis vapours are passed onto the second condensation stage in the series, which is equipped with a collection vessel to collect condensate from both first and second condensation stages.

At least partial condensation occurs in the first condensation stage before the remaining pyrolysis vapours are passed to the second condensation stage. Preferably, substantially all of the $C_{20}$ to $C_{60}$ wax fraction is collected in a collection vessel of the first condensation stage. The collection vessel of the first condensation stage may include an outlet through which condensate may be conveniently extracted. Typically, the temperature within the first condensation stage is significantly lower than the pyrolysis reactor, but higher than the melting point of the condensate composition so that a flow of liquid condensate to the collection vessel remains possible. The second condensation stage, which is operated at a lower temperature than the first condensation stage, includes a collection vessel for collection of condensate, including condensate formed in the first condensation stage in some embodiments. The collection vessel of the second condensation stage may include an outlet through which condensate may be conveniently extracted. In some embodiments, the second condensation stage is the final condensation stage of the series. The final condensation stage is intended to condense substantially all remaining pyrolysis vapours which comprise primarily low boiling components. Thus, the final condensation stage may act as a cold trap which reduces or substantially eliminates pyrolysis vapours contacting the vacuum pump located downstream.

As will be appreciated by the skilled person, additional condensation stages may be included such that more than two condensation stages connected in series are integrated. For example, additional condensation stages may be included between the first and final condensation stages with the intention of separating mid-boiling point fractions of the condensate. In this way, a fractional condensation process may be utilised. Thus, in some embodiments, the multistage condensation consists of three, four, or even five condensation stages connected in series. Nevertheless, in preferred embodiments, the multistage condensation used in the process of the present invention consists of two or three condensation stages only, most preferably only two condensation stages.

In embodiments where more than two condensation stages are connected in series, the second condensation stage is connected to a third condensation stage which is operated at an even lower temperature than the second condensation stage. The third condensation stage may also include an outlet through which condensate may be conveniently extracted.

Any suitable condensation apparatus known to the skilled person which may be used under sub-atmospheric conditions may be utilised for the individual condensation stages in these preferred embodiments of the present invention. Examples of suitable condensation stages include liquid-cooled surface condensers, which may be operated in transverse, parallel or counter flow. Other condensation stages may be configured as quench units, for example a demister quench unit or quench tower.

In preferred embodiments, the first condensation stage corresponds to a demister quench unit or quench tower. In some embodiments, such quench units or towers may be operated with a direct liquid quench in which a liquid coolant contacts the thermal decomposition product directly. As mentioned hereinbefore, suitable coolant liquids for this purpose include liquid propane and supercritical carbon dioxide. When a direct liquid quench is used, the coolant liquid may be conveniently separated from the thermal decomposition product by lowering pressure to boil off the coolant, which may then be captured for recycle. Direct liquid quench is advantageous for rapidly condensing the thermal decomposition product so as to minimise secondary cracking reactions. Consequently, where a direct liquid quench is employed, this is preferably as part of the first condensation stage in the preferred embodiments.

In some embodiments, the temperature of the coolant liquid associated with the first stage may be from 65° C. to 120° C., for example from 75° C. to 100° C., or from 85° C. to 95° C. As will be appreciated by the skilled person, a temperature gradient will exist over the flow path through the condensation stage which differs from the temperature of the coolant. Nevertheless, the degree of cooling within the first stage is to the extent that at least partial condensation of pyrolysis vapours occurs.

In some embodiments, the temperature of the coolant liquid(s) associated with the second and any optional additional intermediate condensation stages, may be from 0° C. to 65° C., for example from 25° C. to 50° C., or from 35° C. to 45° C.

In other embodiments, lower temperatures are used in connection with the first and second condensation stages. For example, in some embodiments, the temperature of the coolant liquid associated with the first condensation stage may be from −20° C. to 50° C., for example from −15° C. to 30° C., or from −10° C. to 10° C. In some embodiments, the temperature of the coolant liquid(s) associated with the second and any optional additional intermediate condensation stages, may be from −30° C. to 10° C., for example from −25° C. to 0° C., or from −20° C. to −10° C. As will be appreciated, lower temperatures in the condensation stages are however associated with higher energy costs.

In some embodiments, the temperature of the coolant liquid associated with the last condensation stage may be from −200° C. to 25° C., for example −80° C. to 15° C. or −25° C. to 10° C.

As will be appreciated by the skilled person, the coolant liquid used at each condensation stage will depend on the temperature at which the coolant is intended to be operated, which may be optimised for the particular conditions of the process, for example reactor temperature and system pressure. Examples of suitable coolants include water or aqueous coolants, hydrocarbon-based coolants, for example propane or glycol, or inorganic coolants such as liquid nitrogen. The skilled person is able to select an appropriate coolant depending on the desired temperature of operation, or indeed if a direct liquid quench is utilised. For example, glycol or liquid nitrogen may be utilized for the cold trap of the final condensation stage, if desired and suitable for the scale of the process.

Any suitable vacuum pump may be used in connection with the process of the present invention. An example of such a pump includes an oil pump. In order to avoid damage to the pump used in the process of the invention, where haloacids are produced during the pyrolysis as a result of the presence of a minor amount of halogenated polymers in the feed, a calcium oxide guard bed may be used upstream of the vacuum pump.

Following the condensation step of the process of the present invention, a condensate is typically obtained comprising a major portion of $C_{20}$ to $C_{60}$ wax, typically together with an amount of a lighter diesel fraction. Thus, the process of the present invention may further comprise a step iii-b) of fractionating the thermal decomposition product effluent (i.e. the liquid/condensed portion of the thermal decomposition product in order to obtain a $C_{20}$ to $C_{60}$ wax fraction substantially free of lighter and/or heavier thermal decomposition products. As the skilled person will be aware, the fractionation may, for instance, be undertaken in a flash vessel operating under reduced pressure or a distillation column. The distillation column may be a conventional distillation column with a number of stages (e.g. ideal stages) commensurate with the separation desired, for example between about 5 and about 50 ideal separation stages.

Lighter fractions, for instance including the diesel fraction, obtained from the fractionation step may be used as a fuel source for the pyrolysis reactor. Where fractionation of the condensed product of the invention containing $C_{20}$ to $C_{60}$ wax affords a fraction containing a major portion of heavier (i.e. larger carbon number) components, this fraction may be recycled to the vacuum pyrolysis reactor for further thermal decomposition.

It will be appreciated that by including a multistage condensation as previously described, the convenient separation of lighter fractions during condensation may simplify or eliminate these distillation requirements. Nonetheless, it will be understood that lighter fractions separated during the condensation may also be used as a fuel source for the pyrolysis reactor or heavier fractions from the condensation could be recycled to the pyrolysis reactor.

By means of the process of the present invention, it is possible to obtain the $C_{20}$ to $C_{60}$ wax fraction as the major portion of the total effluent from the pyrolysis reactor. As the skilled person will appreciate, a major portion is intended to refer to over 50 wt. % of the effluent from the pyrolysis reaction. In preferred embodiments, the $C_{20}$ to $C_{60}$ wax product represents over 55 wt. %, more preferably over 60 wt. %, even more preferably over 65 wt. %, still more preferably over 70 wt. % of the total effluent from the pyrolysis reactor.

The $C_{20}$ to $C_{60}$ wax fraction produced by the process of the present invention typically comprises a mixture of olefins and n-/iso-parrafins. In some embodiments, the $C_{20}$ to $C_{60}$ wax fraction comprises from 20 wt. % to 80 wt. % olefins, preferably from 40 wt. % to 70 wt. % olefins, more preferably from 45 to 65 wt. % olefins. These ranges may apply to the content of 1-olefins, or the combined amount of all olefins present, preferably to the content of 1-olefins only. The $C_{20}$ to $C_{60}$ wax fraction of the present invention may include a higher olefin content than would be expected from the pyrolysis of plastic polyolefin polymer due to the reduction in the level of secondary cracking reactions occurring during the process of the present invention. Thus, there is an increased likelihood of thermal decomposition leading to cracking which does not eliminate the presence of double bonds in the carbon chains of the product compared to alternative processes.

In some embodiments, the $C_{20}$ to $C_{60}$ wax fraction of the process of the invention comprises at least 50 wt. %, preferably at least 75 wt. %, more preferably at least 85 wt. %, even more preferably at least 90 wt. % of $C_{25}$ to $C_{55}$ wax sub-fraction.

In some embodiments, the $C_{20}$ to $C_{60}$ wax fraction of the process of the invention comprises at least 50 wt. %, preferably at least 75 wt. %, more preferably at least 85 wt. %, even more preferably at least 90 wt. % of $C_{25}$ to $C_{50}$ wax sub-fraction.

In some embodiments, the $C_{20}$ to $C_{60}$ wax fraction of the process of the invention comprises at least 50 wt. %, preferably at least 75 wt. %, more preferably at least 85 wt. %, even more preferably at least 90 wt. % of $C_{30}$ to $C_{45}$ wax sub-fraction.

In other embodiments, the $C_{20}$ to $C_{60}$ wax fraction of the process of the invention comprises at least 50 wt. %, preferably at least 75 wt. %, more preferably at least 85 wt. %, even more preferably at least 90 wt. % of $C_{40}$ to $C_{60}$ wax sub-fraction.

In other embodiments, the $C_{20}$ to $C_{60}$ wax fraction of the process of the invention comprises at least 50 wt. %, preferably at least 75 wt. %, more preferably at least 85 wt. %, even more preferably at least 90 wt. % of $C_{20}$ to $C_{30}$ wax sub-fraction.

In accordance with the present invention, it has been surprisingly found that the benefits of the process of the invention in terms of the properties of the $C_{20}$ to $C_{60}$ wax fraction obtained are realised when a particular composition of plastic polyolefin polymer is used for thermal decomposition. In particular, when the weight ratio of polyethylene to polypropylene is from 60:40 to 90:10, preferably from 65:35 to 85:15, more preferably from 70:30 to 80:20, it is has been found that a superior wax fraction is obtainable for subsequent conversion into a lubricant base stock.

In preferred embodiments, the melt point of the $C_{20}$ to $C_{60}$ wax fraction which is obtained from the process of the present invention is from 45 to 80° C., more preferably from 60 to 75° C. The melt point may suitably be determined by ASTM Method D87. Alternatively, where the wax fraction does not show a characteristic melting plateau, the drop melt point of the wax fraction which is obtained from the process of the present invention is from 45 to 80° C., more preferably from 50 to 70° C. Drop melt point may suitably be determined by ASTM Method D127.

In preferred embodiments, the congealing point of the $C_{20}$ to $C_{60}$ wax fraction obtained by the process of the present invention is from 35 to 65° C. The congealing point measures when a wax ceases to flow and may suitably be determined by ASTM Method D938.

In preferred embodiments, the needle penetration at 25° C. of the $C_{20}$ to $C_{60}$ wax fraction obtained by the process of the present invention is from 40 to 100, preferably from 50 to 80.

The needle penetration measures the hardness of the wax and may suitably be determined by ASTM Method D1321.

In preferred embodiments, the kinematic viscosity at 100° C. of the $C_{20}$ to $C_{60}$ wax fraction obtained by the process of the present invention is from 3 to 10 mm²/s (3 to 10 cSt). Kinematic viscosity represents the resistance to flow of a molten wax at the test temperature and may suitably be measured by ASTM Method D445.

Waxes obtained from the pyrolysis of plastic polyolefin polymers typically comprise more double bonds than, for instance, polyolefin waxes formed by high-pressure polymerisation. Determination of the type and level of double bonds in the wax product may be undertaken, for instance, by infrared analysis. Meanwhile average olefin content of the wax may be determined from a combination of NMR analysis and simulated distillation (SimDist) GC. Bromine number may also be measured to determine olefinicity, in accordance with ASTM D1159.

In step iv) of the process of the invention, $C_{20}$ to $C_{60}$ wax fraction is subjected to hydroisomerization in order to produce the lubricant base stock. Where wax products are obtained from conventional biomass pyrolysis, subsequent conversion of the wax to a lubricant base stock requires a hydrotreatment followed by isomerization. Hydrotreatment removes heteroatoms such as N, S and O, which are undesirable in the lubricant base stock since they normally give rise to colour instability, and eliminates double bonds. Meanwhile, isomerization selectively transforms linear paraffins to multi-branched isoparaffins, which improves lubricant properties such as pour point and viscosity index.

Thus, in some embodiments, the $C_{20}$ to $C_{60}$ wax fraction is subjected to a preceding hydrotreatment prior to hydroisomerization in order to produce the lubricant base stock. Where the wax product is hydrotreated, this may be done by contacting the wax product with a hydrotreating catalyst under hydrotreating conditions so as to remove any heteroatoms whilst minimizing hydrocracking. Hydrotreating can be conducted using any conventional hydrotreating catalysts, comprising Co, Mo, Ni, and W metals, typically supported on carriers such as bauxite, alumina, silica, silica-alumina and zeolites. Examples include Ni/Mo on alumina, Co/Mo on alumina, Co/Ni/Mo on alumina (e.g., KF-840, KF-843, HDN-30, HDN-60 and Criteria C-411).

The hydrotreating may be carried out batch wise or continuously in a fixed bed, fluidized bed or slurry phase hydrotreating reactor. The hydrotreating reaction is suitably conducted in the presence of the hydrotreating catalyst at a temperature of from 250° C. to 400° C. The hydrotreating reaction is suitably conducted at pressure of from 1.0 to 25 mPa absolute, for example 2.5 to 20 mPa absolute.

The flow rate, in terms of Liquid Hourly Space Velocity (LHSV), defined as the volume of the liquid wax fed to the hydrotreating reactor per unit volume of hydrotreating catalyst per hour, is preferably in the range of from 0.1 to 5 $h^{-1}$, for example 1.0 to 2.0 $h^{-1}$. The hydrogen-containing gas feed rate may suitably be from 100 to 1,750 $m^3/m^3$ and preferably from 175 to 450 $m^3/m^3$.

The presence of heteroatoms in wax products obtained from conventional biomass pyrolysis is derived, for instance, from the oxygen atoms incorporated in the lignocellulosic constituents of the biomass and so these must be removed as part of the conversion process. Wax products derived from natural petroleum sources also contain quantities of sulphur and nitrogen compounds which are known to contribute to the deactivation of wax hydroisomerization catalysts. To prevent this deactivation, it is preferred that the wax feed to the hydroisomerization reaction contain less than 10 ppmw sulphur, preferably less than 5 ppmw sulphur and less than 2 ppmw nitrogen, preferably less than 1 ppmw nitrogen.

In contrast, the wax product obtained from the thermal decomposition of plastic polyolefin polymer in accordance with the present invention is substantially free of heteroatoms and therefore hydrotreatments for removing heteroatoms may be rendered completely redundant. As will be appreciated, the process of the present invention does not require the presence of biomass in the plastic polyolefin polymer feed, and it is preferred that co-processing of plastic polyolefin polymer and biomass is not conducted as part of the process of the present invention.

Thus, in preferred embodiments, the process for preparing a lubricant base stock in accordance with the present invention does not include a hydrotreatment step for removing heteroatoms prior to the hydroisomerization step. Therefore, the wax fraction obtained from the pyrolysis preferably contains less than 10 ppmw sulphur, more preferably less than 5 ppmw sulphur and preferably less than 2 ppmw nitrogen, more preferably less than 1 ppmw nitrogen. Use of the wax fraction obtained from the pyrolysis process of the present invention thus can make the overall conversion more efficient. As the skilled person will appreciate, content of heteroatoms in the wax may be verified by GC-NPD or chemiluminescence.

In some embodiments, the $C_{20}$ to $C_{60}$ wax fraction is subjected to a wash or filtration treatment, for example passing through a liquid-phase guard bed, in order to remove metal ions/salts or any inorganic contaminants, such as nitrogen-containing compounds. An aqueous wash followed by a drying treatment may for instance be undertaken to remove inorganic contaminants and metal ions/salts prior to committing the $C_{20}$ to $C_{60}$ wax fraction to the hydroisomerization reaction. Where a liquid phase guard bed is employed, the guard bed is thermally stable and may comprise silica-alumina or thermally stable ion exchange resins (for example Amberlyst® XE-386).

Where a lubricant base stock is prepared from a wax that has not undergone a hydrotreatment, or where hydrotreatment cannot remove all double bonds in the wax, the isomerization should be a hydroisomerization (i.e. isomerization performed in the presence of hydrogen and a hydro/dehydrogenation catalyst component). Hydroisomerization not only introduces branching, but also produces saturated products by eliminating double bonds that are present in the carbon chains, as would normally be achieved in a preceding hydrotreatment step. Hydroisomerization may be achieved by any suitable means known to the skilled person, although preferably one which minimises hydrocracking of the wax feed.

Typically, hydroisomerization employs a hydroisomerization (bifunctional) catalyst typically comprising a porous solid acid catalyst component, which provides $H^+$ donors for the isomerization reaction, and a hydrogenation/dehydrogenation metal component, which results in elimination of double bonds in the carbon chains. Preferably the hydroisomerization catalyst has a high selectivity for the isomerization of linear or near linear paraffins of the wax to a lube boiling range product have a boiling point in excess of 345° C.

High selectivity for the isomerization of linear or near linear paraffins has been found to be particularly beneficial for the efficient and economical provision of a lubricant base stock from the $C_{20}$ to $C_{60}$ wax fraction obtained from the pyrolysis in accordance with the present invention. The level of branching already present in the $C_{20}$ to $C_{60}$ wax fraction means that the high selectivity catalyst may achieve sufficient conversion to a lubricant base stock under less energy intensive conditions than would otherwise be possible.

Suitable metal components for the hydroisomerization catalyst are selected from IUPAC Groups 8 to 10, such as Fe, Ru, Os, Co, Rh, Ir, Ni, Pd and Pt, or combinations thereof. Preferably, the metal component is selected from Pt, Pd or a combination thereof. Suitable porous solid acid components include zeolite, silica-aluminophosphate, silica, alumina, silica-alumina or combinations thereof. Preferably, the solid acid is a zeolite, a silica-aluminophosphate, or a combination thereof.

The amount of the metal component present in the hydroisomerization catalyst is typically from 0.1 to 20 wt %, based on the total weight of the hydroisomerization catalyst, preferably 0.3 to 10 wt %. If the metal is Pt, Pd or a combination thereof, the preferred amount of the metal component present in the hydroisomerization catalyst is from 0.1 to 5 wt %, as a result of their high hydrogenation activities.

Various pore sizes and geometries may be utilised for the solid acid support, which can be tailored based on the particular composition of the wax fraction fed to the hydroisomerization and the composition and properties of the desired lubricant base stock produced. In some embodiments, the solid acid is of the 10-membered ring variety (10 oxygen atoms in the ring defining the pore opening) or 12-membered ring variety (12 oxygen atoms in the ring defining the pore opening). Preferably, the solid acid is of the 10-membered ring variety.

In preferred embodiments, an intermediate pore size solid acid is used having a minimum pore opening diameter of 4.8 Å, more preferably 5.3 Å, and a maximum pore opening diameter of 7.1 Å, more preferably 6.5 Å, when the solid acid is in the calcined form. These intermediate pore sizes discourage hydrocracking reactions, whilst still allowing methyl branching to occur. Consequently, the solid acids are optimized to allow the initially formed branched species to escape the pore system before cracking occurs, as discussed in EP 0504590 and WO 1992/001769. Modifying acid strength can also be employed as a means for optimizing selectivity for hydroisomerization over hydrocracking, as discussed below. Pore size distribution and average pore radius/diameter can be determined readily by known methods, for instance using standard adsorption techniques and hydrocarbonaceous compounds of known minimum kinetic diameters. Non-linear density functional theory (DFT) methods may for instance be employed, which are described in detail in Colloids and Surfaces A: Physicochemical and Engineering Aspects, 437 (2013) 3-32.

Specific examples of large pore size solid acids include ZSM-3, ZSM-12, ZSM-20, MCM-37, MCM-68, ECR-5, SAPO-5, SAPO-37, as well as beta, Y, preferably ultra-stable Y (USY), and mordenite zeolites. Examples of intermediate pore size solid acids, which are preferred for their selectivity as discussed above, include ZSM-22, ZSM-23, ZSM-35, ZSM-48, ZSM-57, SAPO-11, MAPO-11, SM-3, SM-6, SSZ-32 and ferrierite. Particularly, preferred solid acids are selected from ZSM-22, ZSM-23, SAPO-11 and combinations thereof. A description and example preparation of ZSM-23 is, for instance, provided in U.S. Pat. Nos. 4,076,842 and 4,104,151, whilst the synthesis of SAPO-11 is described in U.S. Pat. Nos. 4,943,424 and 4,440,871. A discussion of the selectivity benefits of ZSM-22, ZSM-23 and SAPO-11 is also discussed in Pet. Sci. (2013)10:242-250, as well as other methods for preparing ZSM-22 and ZSM-23.

Combinations of different solid acids having different pore sizes may be used in order to provide a desired level of catalyst selectivity based on the wax feed. Such combinations may be used successively in separate hydroisomerization reactions or concurrently in a single hydroisomerization reaction. For example, one solid acid may comprise channels defined by a 10-membered ring whilst another is defined by a 12-membered ring.

Generally, catalysts with a high hydrogenation activity and a low degree of acidity are favorable for maximizing hydroisomerization versus hydrocracking. Thus, reducing the catalyst acidity can be beneficial for reducing the cracking activity. Acidity of the solid acid may be measured using $NH_3$-temperature programmed desorption (TPD) or benzonitrile-TPD. Particularly preferred hydroisomerization catalysts for maximizing hydrosiomerization selectivity comprise an intermediate pore size solid acid selected from ZSM-22, ZSM-23, ZSM-35, ZSM-48, ZSM-57, SAPO-11, MAPO-11, SM-3, SM-6, SSZ-32, ferrierite and combinations thereof, more preferably selected ZSM-22, ZSM-23 SAPO-11 and combinations thereof with a metal component selected from Pt, Pd or a combination thereof.

The catalyst may be promoted or doped with additional metals to modify the performance of the catalyst, including for enhancing isomerization and reduction of cracking activity catalyst.

Such metals include magnesium, rare earth metals (e.g. lanthanum, cerium and praseodymium), strontium, barium, sodium, potassium and neodymium.

The solid acid may be prepared by any suitable means or sourced directly. The solid acid may be suitably modified with the hydro/dehydrogenation metal function, and optionally with any of the above additional doping metals by, for instance, impregnation, ion-exchange or precipitation, all of which are familiar to the skilled person.

A suitable impregnation method, for example, comprises impregnating a solid acid material with a metal compound which is thermally decomposable to the oxide form. Any suitable impregnation technique including the incipient wetness technique or the excess solution technique, both of which are well-known in the art, may be employed. The incipient wetness technique is so-called because it requires that the volume of impregnating solution be predetermined so as to provide the minimum volume of solution necessary to just wet the entire surface of the solid acid, with no excess liquid. The excess solution technique as the name implies, requires an excess of the impregnating solution, the solvent being thereafter removed, usually by evaporation.

The impregnation solution may suitably be either an aqueous solution or a non-aqueous, organic solution of the thermally decomposable metal compound. Suitable non-aqueous organic solvents include, for example, alcohols, ketones, liquid paraffinic hydrocarbons and ethers. Alternatively, aqueous organic solutions, for example an aqueous alcoholic solution, of the thermally decomposable metal compound may be employed. Impregnation may be conducted with a solid acid material which is in a powder, granular or pelletized form. Alternatively, impregnation may be conducted with a solid acid material which is in the form of a shaped extrudate.

Preparation of the activated bifunctional metal treated solid acid catalyst is typically achieved by calcination followed by a reduction to the ground state of the metal. Calcination may be performed by any method known to those of skill in the art, for instance in a fluidized bed or rotary kiln at a temperature in the range of from 200° C. to 700° C. Reduction to the active metal state is typically achieved with treatment with hydrogen at a temperature from 200° C. to 700° C., preferably from 300° C. to 500° C., and at least atmospheric pressure. As the skilled person will appreciate, reduction to the active catalyst may occur in the hydroisomerization reactor itself which is supplied with a hydrogen-containing gas stream.

The hydrogen-containing gas stream supplying the hydroisomerization reactor suitably comprises over 50 wt. % of hydrogen gas, the remaining constituents being one or more inert diluents, provided they are not detrimental to catalyst performance or the hydroisomerization reaction. Any excess of hydrogen-containing gas is advantageously recycled, possibly after removal of undesired components therefrom.

In a specific example, a bifunctional hydroisomerization catalyst as described hereinbefore in preferred embodiments is prepared by impregnating a calcined zeolite solid acid (ZSM-22) with a solution of tetraammonium platinum (II) chloride [$(NH_3)_4PtCl_2$] by incipient wetness to give a platinum loading of 0.5 wt %. The impregnated material is then dried in an oven at a temperature of 110° C. for 24 hours before being transferred to a hydroisomerization reactor. The active catalyst is then obtained by contacting the catalyst with a stream of hydrogen gas at a temperature of 350° C.

The hydroisomerization may be carried out batch wise or continuously in a fixed bed, fluidised bed or slurry phase hydroisomerization reactor. The hydroisomerization reaction is typically conducted in the presence of the hydroisomerization catalyst and hydrogen at a temperature of from 250° C. to 450° C., preferably at a temperature of from 300° C. to 400° C. Nevertheless, it will be appreciated that by using a mixed feed comprising polypropylene and polyethylene in accordance with the invention, the increase in the amount of branching in the waxes obtained from the pyrolysis reaction can reduce the energy burden associated with the isomerization step, i.e. such that the isomerization may be conducted at a lower temperature than is typically used. Thus, in some preferred embodiments, the hydroisomerization reaction is conducted at a temperature of from 200° C. to 400° C., preferably from 200° C. to 300° C. In other embodiments, the hydroisomerization reaction is conducted at a temperature of less than 350° C., preferably less than 300° C., for example, less than 250° C. The hydroisomerization reaction is nevertheless preferably conducted at a temperature of at least 200° C.

The hydroisomerization reaction is suitably conducted at a pressure of from 1.0 to 25 mPa absolute, preferably from 5.0 to 15 mPa absolute, for a period, for instance, ranging from 0.5 hour to 24 hours.

In a particularly preferred embodiment, where the hydroisomerization catalyst includes an intermediate pore size solid acid selected from ZSM-22, ZSM-23, ZSM-35, ZSM-48, ZSM-57, SAPO-11, MAPO-11, SM-3, SM-6, SSZ-32, ferrierite and combinations thereof, the temperature of the hydroisomerization reaction may be from 200° C. to 300° C. In this embodiment, the selectivity obtainable with the hydroisomerization catalyst, taken in combination with the level of branching in the $C_{20}$ to $C_{60}$ wax fraction obtained from the pyrolysis in accordance with the present invention, is particularly effective for allowing the use of lower temperatures in the hydroisomerization reactor.

The flow rate, in terms of Liquid Hourly Space Velocity (LHSV), defined as the volume of the liquid wax fed to the hydroisomerization reactor per unit volume of catalyst per hour, is preferably in the range of from 0.1 to 12 $h^{-1}$, more preferably in the range of from 0.2 to 10 $h^{-1}$, even more preferably in the range of from 0.3 to 8 $h^{-1}$. The hydrogen-containing gas feed rate may suitably be such that the hydrogen to liquid wax ratio is from 100 to 1,750 $m^3/m^3$, preferably from 100 to 700 $m^3/m^3$, and more preferably from 150 to 600 $m^3/m^3$, for example 175 to 450 $m^3/m^3$.

It will be understood that by using a mixed feed comprising polypropylene, the increase in the amount of branching in the waxes obtained from the pyrolysis reaction can reduce the hydrogen consumption during hydroisomerization. In this way, the hydrogen to liquid wax ratio may be lower than is typically used, as a result of a lower hydrogen demand, allowing for a more efficient hydroisomerization process.

In addition to increasing the efficiency of the hydroisomerization step, lubricant base stocks produced according to embodiments of the present invention have been surprisingly found to exhibit particularly desirable properties, particularly in terms of a balance of pour point and viscosity index. Lubricant base stocks produced according to embodiments of the present invention have also been found to exhibit particularly favourable Noack volatility.

Following the hydroisomerization, the isomerate product which is obtained may be fractionated, if necessary, into a lubricant base stock fraction and lighter fuels fraction. The lubricant base stock fraction is typically considered to be that having a boiling point in excess of 345° C.

The isolated lubricant base stock product fraction may, if needed, be subjected to a dewaxing step in order to achieve a target pour point, for instance by a solvent dewaxing process which removes residual wax, preferably for recycling back to the hydroisomerization step. A typical target pour point is −20° C. or lower. In solvent dewaxing, the lubricant base stock comprising residual wax is dissolved in an organic solvent and gradually cooled to cause crystallization of the wax, which is subsequently separated from the solvent/oil mixture by filtration. Suitable solvents for this treatment are liquefied propane and butane, pentane, benzene, toluene, acetone, methyl ethyl ketone, or mixtures thereof, as well as mixtures of one or more aromatic compounds with methyl ethyl ketone. Dewaxing is preferably carried out using a mixture of 40-60 parts by volume of methyl ethyl ketone and 60-40 parts by volume of toluene at a temperature between −10° and −30° C., wherein the volume ratio of the solvent and oil being between 1 and 10.

In some embodiments, the lubricant base stock obtained from the process of the present invention has a Kv40 of from 5 to 60 cSt, preferably from 10 to 40 cSt.

In some embodiments, the lubricant base stock obtained from the process of the present invention has a Kv100 of from 1 to 15 cSt, preferably from 1.5 to 10 cSt, more preferably from 1.5 to 8.5 cSt (such as 2, 4, 5, 6, 7 or 8), still more preferably from 3.5 to 8.5 cSt (such as 4, 5, 6, 7 or 8), and most preferably from 3.5 to 6.5 cSt (such as 4, 5 or 6).

In preferred embodiments, the lubricant base stock obtained from the process of the present invention has a pour point of −40° C. or less, preferably of −60° C. or less, as measured in accordance with ASTM D97-11.

In preferred embodiments, the lubricant base stock obtained from the process of the present invention has a viscosity index (VI) of 100 or greater, more preferably from 120 to 160, as measured in accordance with ASTM D2270.

Preferably, the lubricant base stock obtained from the process of the present invention is a Group III/Group III+ base oil. As the skilled person will appreciate, Group III+ base oils correspond to Group III base oils with particularly high viscosity index (for example, at least 135 as measured by ASTM D2270).

Once the lubricant base stock product has been obtained, a lubricating composition may be formulated from the base stock. Lubricating compositions generally comprise the base stock of lubricating viscosity together with one or more additives to deliver properties including, for example, reduced friction and wear, improved viscosity index, detergency, dispersancy and resistance to oxidation and corrosion by, for example, acidic by-products. Thus, in another embodiment, the lubricant base stock obtained from the process of the present invention is blended to form a lubricant composition comprising one or more lubricant additives.

In another aspect, the present invention provides a method of lubricating a surface which comprises applying to said surface a lubricating composition prepared by the process as defined hereinbefore. Suitable surfaces include those in power transmission systems for example drive lines and gear boxes for example for vehicles including, for example, passenger vehicles and heavy duty vehicles; and those in internal combustion engines, for example the crankcases of internal combustion engines. Suitable surfaces also include those in turbine bearings for example in water turbine bearings. Suitable internal combustion engines include, for example, engines used in automotive applications, engines used in marine applications and engines used in land-based power generation plants.

Suitable lubricant additives for the lubricating composition include detergents (including metallic and non-metallic detergents), friction modifiers, dispersants (including metallic and non-metallic dispersants), viscosity modifiers, dispersant viscosity modifiers, viscosity index improvers, pour point depressants, anti-wear additives, rust inhibitors, corrosion inhibitors, antioxidants (sometimes also called oxidation inhibitors), anti-foams (sometimes also called anti-foaming agents), seal swell agents (sometimes also called seal compatibility agents), extreme pressure additives (including metallic, non-metallic, phosphorus containing, non-phosphorus containing, sulphur containing and non-sulphur containing extreme pressure additives), surfactants, demulsifiers, anti-seizure agents, wax modifiers, lubricity agents, anti-staining agents, chromophoric agents, metal deactivators, and mixtures of two or more thereof.

In at least some examples, the one or more lubricant additives include at least one detergent. Examples of detergents include ashless detergents (that is, non-metal containing detergents) and metal-containing detergents. Suitable non-metallic detergents are described for example in U.S. Pat. No. 7,622,431. Metal-containing detergents comprise at least one metal salt of at least one organic acid, which is called soap or surfactant. The metals of the salts may be alkali metals, alkaline earth metals and combinations thereof. For example, the metals are calcium, magnesium and combinations thereof. Calcium and magnesium detergent salts may both be present in the lubricating oil composition. Suitable metals detergents are neutral and overbased salts a TBN (total base number as measured by ASTM D2896) in the range about 20 to about 450. Suitable calcium sulfonates may have TBN (total base number) values of about 85, about 300 and about 400. Suitable calcium phenates may have TBN values of about 150 and about 250. Suitable calcium salicylate may have TBN values of about 150 and about 300. Suitable organic acids include for example, sulphonic acids, phenols (suitably sulphurised and including for example, phenols with more than one hydroxyl group, phenols with fused aromatic rings, phenols which have been modified for example, alkylene bridged phenols, and Mannich base-condensed phenols and saligenin-type phenols, produced for example by reaction of phenol and an aldehyde under basic conditions) and sulphurised derivatives thereof, and carboxylic acids including for example, aromatic carboxylic acids (for example hydrocarbyl-substituted salicylic acids and derivatives thereof, for example hydrocarbyl substituted salicylic acids and sulphurised derivatives thereof). The at least one detergents may be present in the lubricating oil composition in a total amount of about 0.5 to about 12% by weight of the composition, for example about 1 to 3% by weight of the composition.

In at least some examples, the one or more lubricant additives include at least one friction modifier. Suitable friction modifiers include for example, ash-producing additives and ashless additives. Examples of suitable friction modifiers include fatty acid derivatives including for example, fatty acid esters, amides, amines, and ethoxylated amines. Examples of suitable ester friction modifiers include esters of glycerol for example, mono-, di-, and tri-oleates, mono-palmitates and mono-myristates. A particularly suitable fatty acid ester friction modifier is glycerol monooleate. Examples of suitable friction modifiers also include molybdenum compounds for example, organo molybdenum compounds, molybdenum dialkyldithiocarbamates, molybdenum dialkylthiophosphates, molybdenum disulphide, tri-molybdenum cluster dialkyldithiocarbamates, non-sulphur molybdenum compounds and the like. Suitable molybdenum-containing compounds are described for example, in EP 1533362 A1 for example in paragraphs [0101] to [0117]. The at least one friction modifier may be present in the lubricating oil composition in a total amount of less than about 1% by weight of the composition, for example about 0.05 to about 0.8% by weight.

In at least some examples, the one or more lubricant additives include at least one dispersant. Each dispersant comprises one or more, for example at least two, oil soluble polymeric hydrocarbon backbones, each having one or more functional groups which are capable of associating with particles to be dispersed. The functional groups may be amine, alcohol, amide, or ester groups. Examples of suitable ashless dispersants include oil soluble salts, esters, amino-esters, amides, imides and oxazolines of long chain hydrocarbon-substituted mono- and polycarboxylic acids or anhydrides thereof; thiocarboxylate derivatives of long chain hydrocarbons; long chain aliphatic hydrocarbons containing polyamine moieties attached directly thereto; Mannich condensation products formed by condensing a long chain substituted phenol with formaldehyde and polyalkylene polyamine; Koch reaction products and the like. Preferred dispersants are polyisobutenyl succinimide dispersants. Suitable dispersants may be provided in one or more additive concentrates which may be used to provide a total active dispersant concentration of about 2.1% by weight in the lubricating oil composition. The at least one dispersant may be present in the lubricating oil composition in a total amount of active dispersants of from about 1.5 to about 8% by weight of the lubricating oil composition, for example in a total amount of active dispersants of from about 2 to about 2.5% by weight of the lubricating oil composition.

In at least some examples, the one or more lubricant additives include at least one dispersant viscosity modifiers. Each dispersant viscosity modifier may comprise more than one oil soluble, polymeric hydrocarbon backbone each having one or more functional groups which are capable of associating with particles to be dispersed. Each functionalised polymeric hydrocarbon backbone may be functionalised with one or more functional groups incorporated into the backbone or with one or more functional groups pendant from the polymer backbone. Typical functional groups may be polar and may contain one or more hetero atoms, for example phosphorus, oxygen, sulphur, nitrogen, halogen or boron. An example of a suitable dispersant viscosity modifier is a co-polymer of ethylene-propylene grafted with an active monomer, for example maleic anhydride and then derivatized with an alcohol or amine. The preparation of such dispersant viscosity modifiers is described for example in U.S. Pat. Nos. 4,089,794, 4,160,739 and 4,137,185.

Other dispersant viscosity modifiers which may be used are copolymers of ethylene or propylene reacted or grafted with nitrogen compounds, for example as described in U.S. Pat. Nos. 4,068,056, 4,068,058, 4,146,489 and 4,149,984. Other dispersant viscosity modifiers which may be used are graft copolymers, for example as described in WO 96/12746 and WO 99/21902. The one or more dispersant viscosity modifiers may be used with one or more surfactants. These may stabilise the dispersant.

In at least some examples, the one or more lubricant additives include at least one viscosity index improver. Examples of suitable viscosity modifiers include high molecular weight hydrocarbon polymers (for example polyisobutylene, copolymers of ethylene and propylene and higher alpha-olefins); polyesters (for example polymethacrylates); hydrogenated poly(styrene-co-butadiene or isoprene) polymers and modifications (for example star polymers); and esterified poly(styrene-co-maleic anhydride) polymers. Oil-soluble viscosity modifying polymers generally exhibit number average molecular weights of at least about 15,000 to about 1,000,000, for example about 20,000 to about 600,000, as determined by gel permeation chromatography or light scattering methods.

In at least some examples, the one or more lubricant additives include at least one pour point depressant. Examples of suitable pour point depressants include $C_8$ to $C_{18}$ dialkyl fumarate/vinyl acetate copolymers, methacrylates, alkyl methacrylates, polyacrylates, polyarylamides, polymethacrylates, polyalkyl methacrylates, vinyl fumarates, styrene esters, condensation products of haloparaffin waxes and aromatic compounds, vinyl carboxylate polymers, terpolymers of dialkyfumarates, vinyl esters of fatty acids and allyl vinyl ethers, wax naphthalene and the like. The at least one pour point depressants may be present in the lubricating oil composition in a total amount of up to 1% by weight of the lubricating oil composition, for example in a total amount of about 0.05 to about 0.8% by weight.

In at least some examples, the one or more lubricant additives include at least one anti-wear additive. Examples of suitable anti-wear additives include non-phosphorus containing additives for example, sulphurised olefins. Examples of suitable anti-wear additives also include phosphorus-containing antiwear additives. Examples of suitable ashless phosphorus-containing anti-wear additives include trilauryl phosphite and triphenylphosphorothionate and those disclosed in paragraph [0036] of US 2005/0198894. Examples of suitable ash-forming, phosphorus-containing anti-wear additives include dihydrocarbyl dithiophosphate metal salts. Examples of suitable metals of the dihydrocarbyl dithiophosphate metal salts include alkali and alkaline earth metals, aluminium, lead, tin, molybdenum, manganese, nickel, copper and zinc. Particularly suitable dihydrocarbyl dithiophosphate metal salts are zinc dihydrocarbyl dithiophosphates (ZDDP). Primary and/or secondary hydrocarbyl groups may be present in these compounds. Each hydrocarbyl group may have 1 to 18 carbon atoms. The at least one anti-wear additive may be present in the lubricating oil composition in a total amount of about 100 ppm to about 1,000 ppm by weight of the composition, for example about 250 to 800 ppm by weight of the composition.

In at least some examples, the one or more lubricant additives include at least one rust inhibitor. Examples of suitable rust inhibitors include non-ionic polyoxyalkylene polyols and esters thereof, polyoxyalkylene phenols, polyoxyalkylene polyols, anionic alkyl sulphonic acids, zinc dithiophosphates, metal phenolates, basic metal sulphonates, fatty acids and amines.

In at least some examples, the one or more lubricant additives include at least one corrosion inhibitor. Examples of corrosion inhibitors non-ionic polyoxyalkylene polyols and esters thereof, polyoxyalkylene phenols, thiadiazoles, triazoles, anionic alkyl sulphonic acids, and phosphosulphurised hydrocarbons and the products obtained by the reaction of phosphosulphurised hydrocarbon with an alkaline earth metal oxide or hydroxide. Examples of suitable epoxidised ester corrosion inhibitors are described in US 2006/0090393. The at least one corrosion inhibitors may be present in the lubricating oil composition in a total amount of up to about 1% by weight of the lubricating oil composition, for example in a total amount of about 0.05 to about 0.8% by weight of the lubricating oil composition.

In at least some examples, the one or more lubricant additives include at least one antioxidant. Examples of suitable antioxidants include alkylated diphenylamines, N-alkylated phenylenediamines, phenyl-α-naphthylamine, alkylated phenyl-α-naphthylamines, dimethylquinolines, trimethyldihydroquinolines and oligomeric compositions derived therefrom, hindered phenolics (including ashless (metal-free) phenolic compounds and neutral and basic metal salts of certain phenolic compounds), aromatic amines (including alkylated and non-alkylated aromatic amines), sulphurised alkyl phenols and alkali and alkaline earth metal salts thereof, alkylated hydroquinones, hydroxylated thiodiphenyl ethers, alkylidenebisphenols, thiopropionates, metallic dithiocarbamates, 1,3,4-dimercaptothiadiazole and derivatives, oil soluble copper compounds (for example, copper dihydrocarbyl thio- or thio-phosphate, copper salts of a synthetic or natural carboxylic acids, for example a $C_8$ to $C_{18}$ fatty acid, an unsaturated acid or a branched carboxylic acid, for example basic, neutral or acidic $Cu^I$ and/or $Cu^{II}$ salts derived from alkenyl succinic acids or anhydrides), alkaline earth metal salts of alkylphenolthioesters, suitably containing $C_5$ to $C_{12}$ alkyl side chains, calcium nonylphenol sulphide, barium t-octylphenyl sulphide, dioctylphenylamine, phosphosulphised or sulphurised hydrocarbons, oil soluble phenates, oil soluble sulphurised phenates, calcium dodecylphenol sulphide, phosphosulphurised hydrocarbons, sulphurised hydrocarbons, phosphorus esters, low sulphur peroxide decomposers and the like. The at least one anti-oxidants may be present in the lubricating oil composition in a total amount of up to about 5% by weight of the lubricating oil composition, for example from about 1 to 3% by weight of the lubricating oil composition.

In at least some examples, the one or more lubricant additives include at least one antifoam. Examples of suitable anti-foam agents include silicones, organic polymers, siloxanes (including poly siloxanes and (poly) dimethyl siloxanes, phenyl methyl siloxanes), acrylates and the like. The at least one anti-foaming agents may be present in the lubricating oil composition in a total amount by weight typically of about 10 to about 100 ppm of the lubricating oil composition, for example in a total amount by weight of about 25 to about 75 ppm of the lubricating oil composition.

In at least some examples, the one or more lubricant additives include at least one seal swell agent. Examples of suitable seal swell agents include long chain organic acids, organic phosphates, aromatic esters, aromatic hydrocarbons, esters (for example butylbenzyl phthalate) and polybutenyl succinic anhydride.

Figure 2:
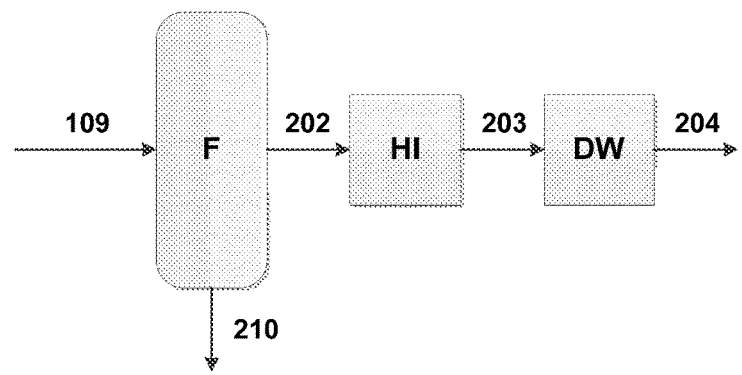
Figure 3:
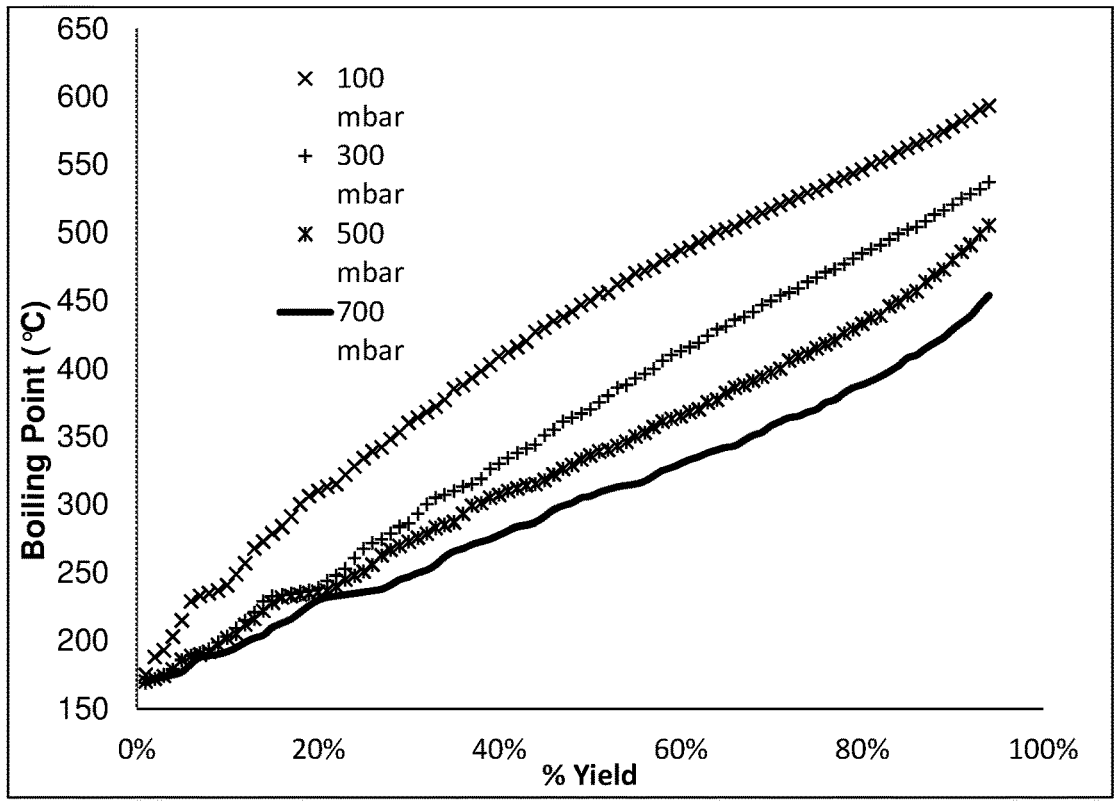
Figure 4:
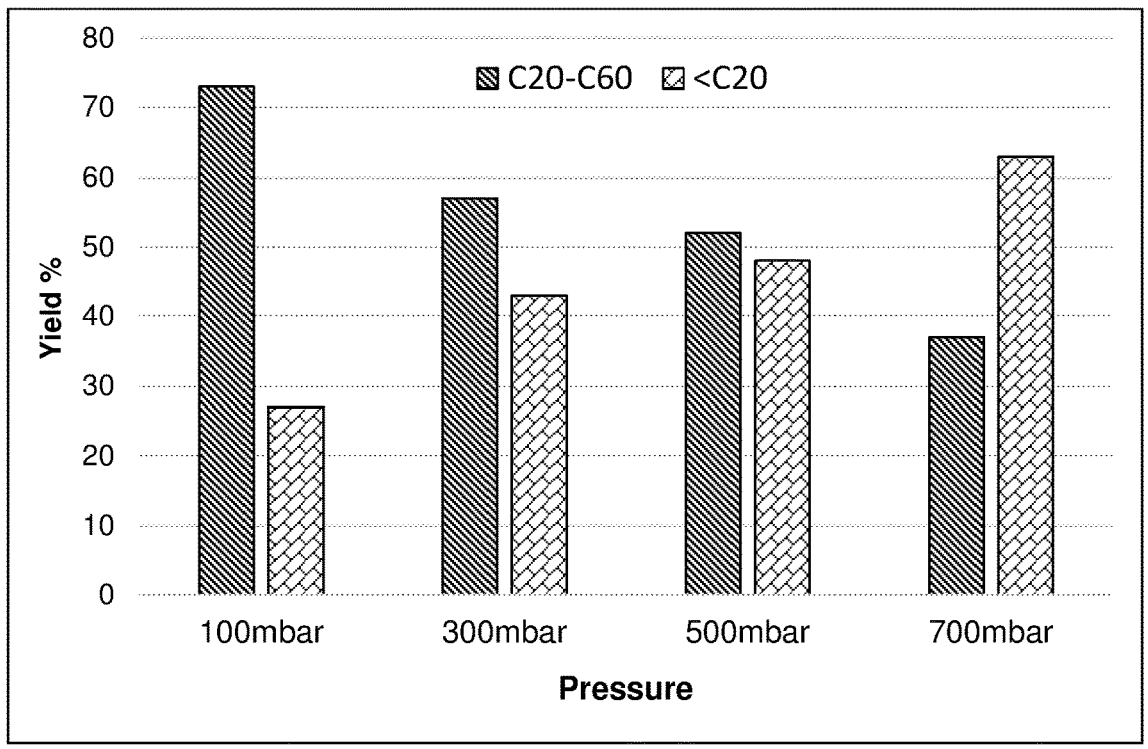
Figure 5:
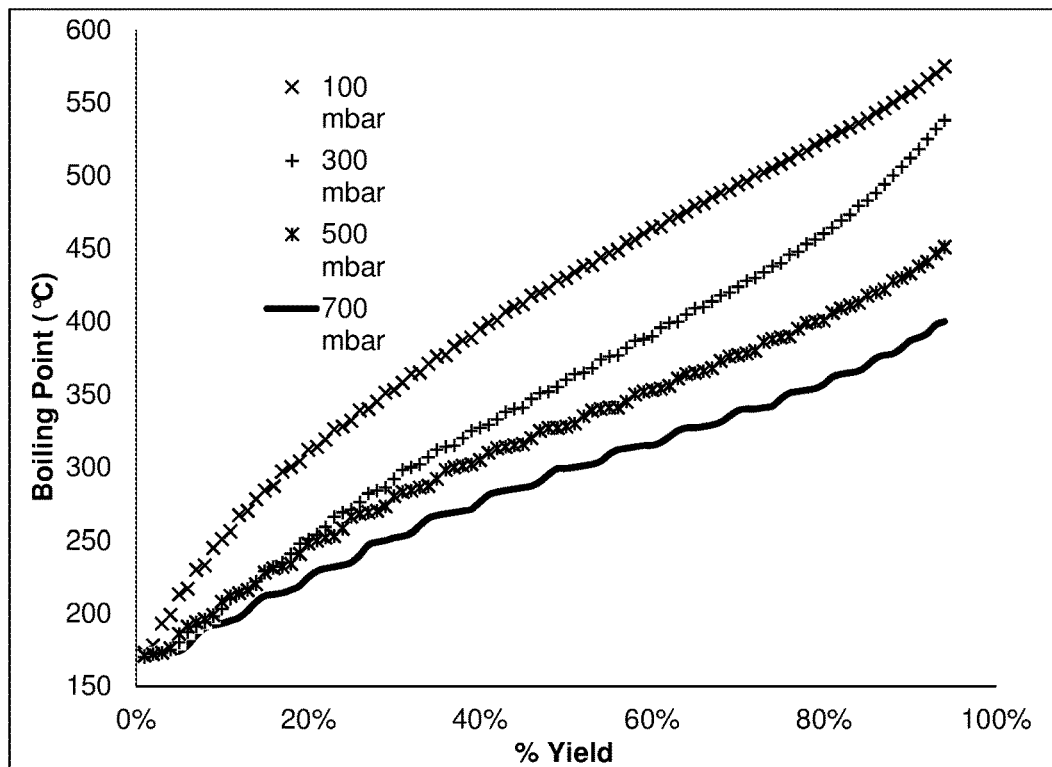
Figure 6:
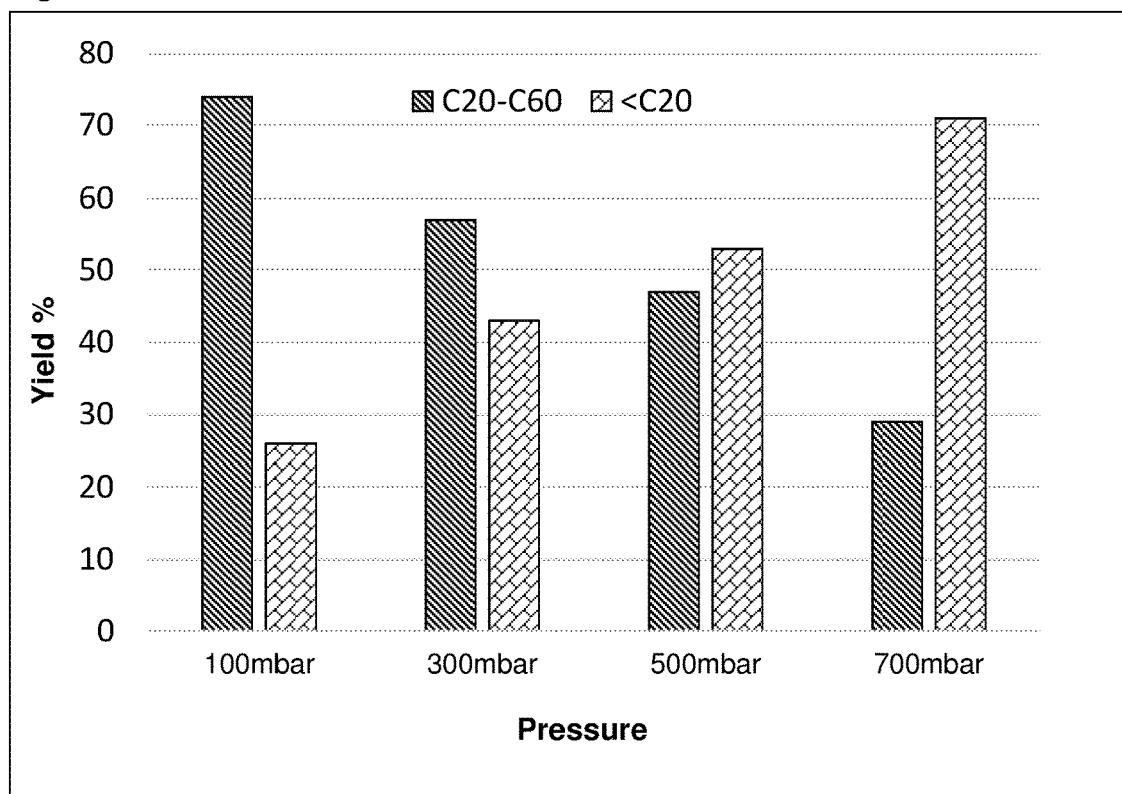
Figure 7:
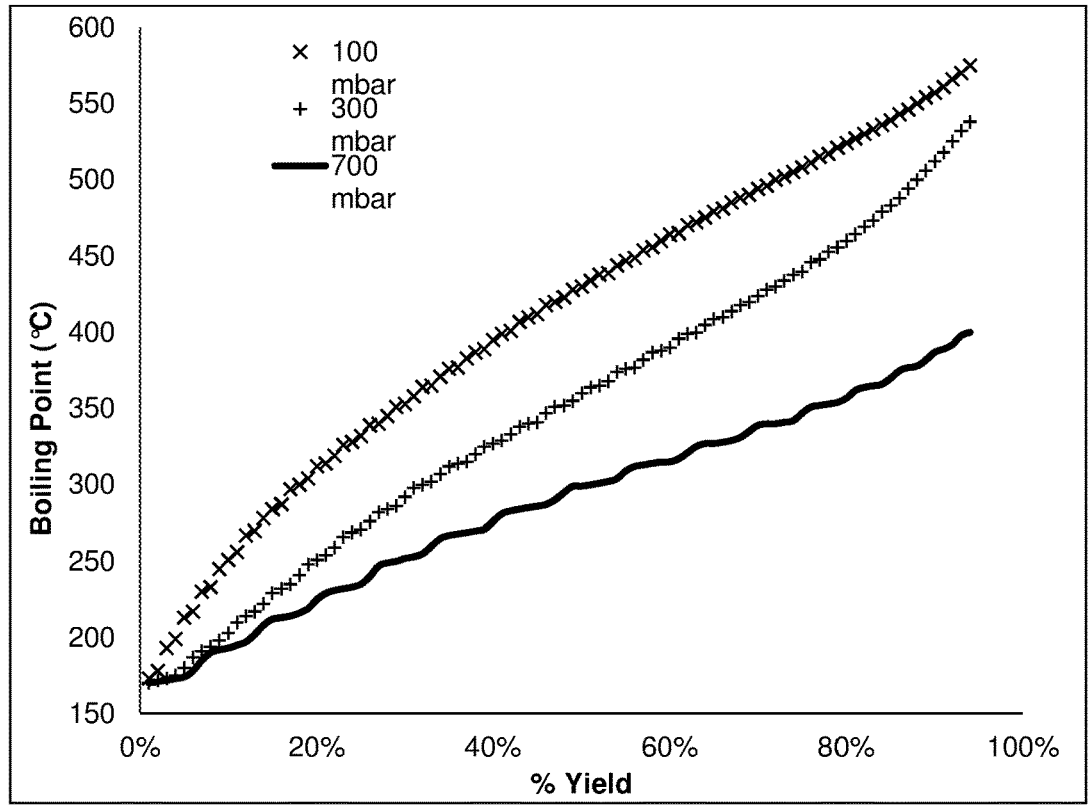
Figure 8:
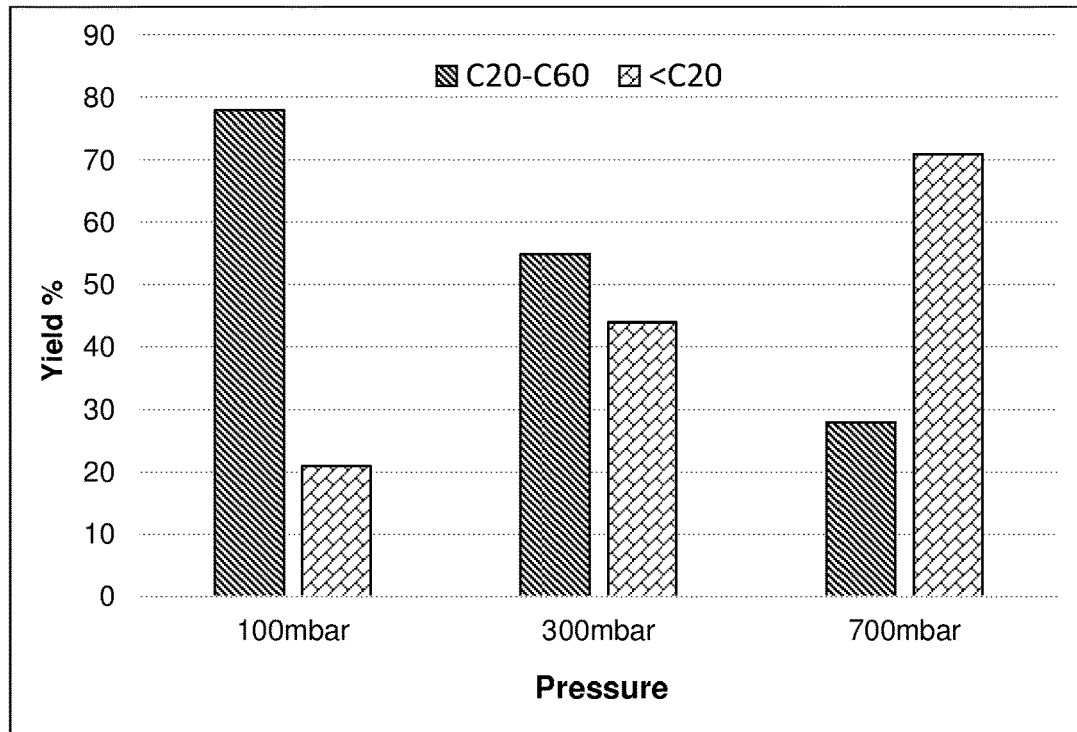
Figure 9:
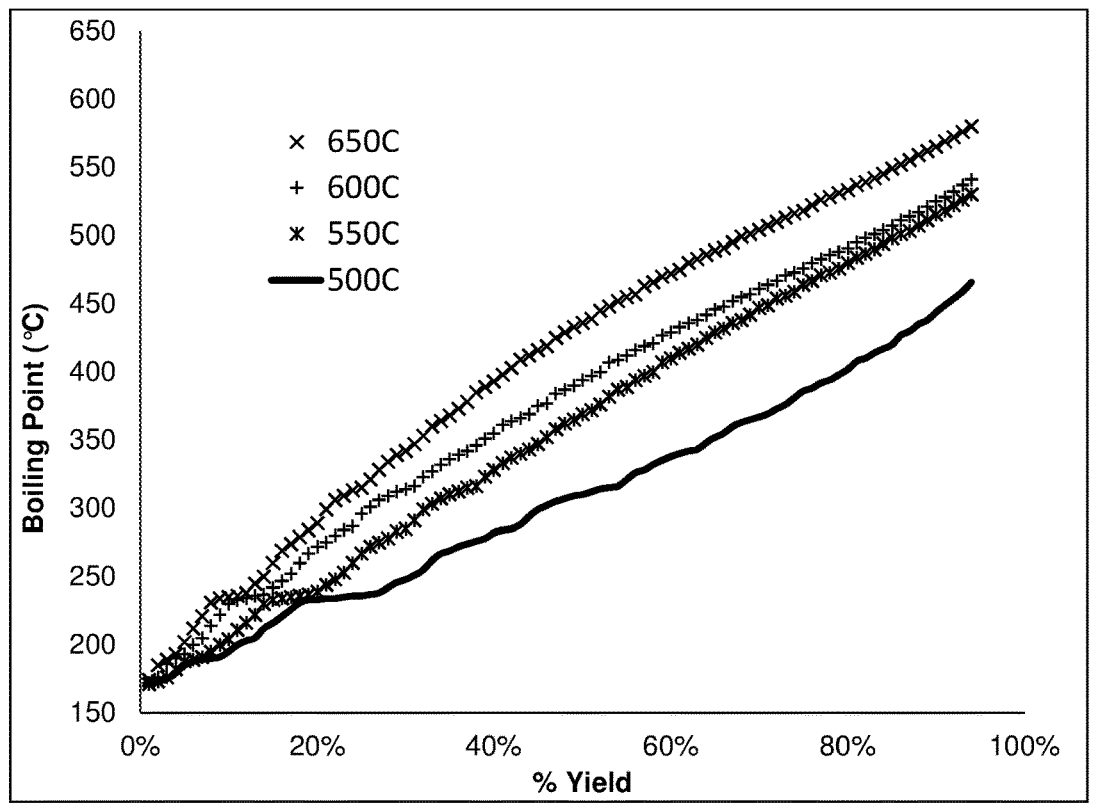
Figure 10:
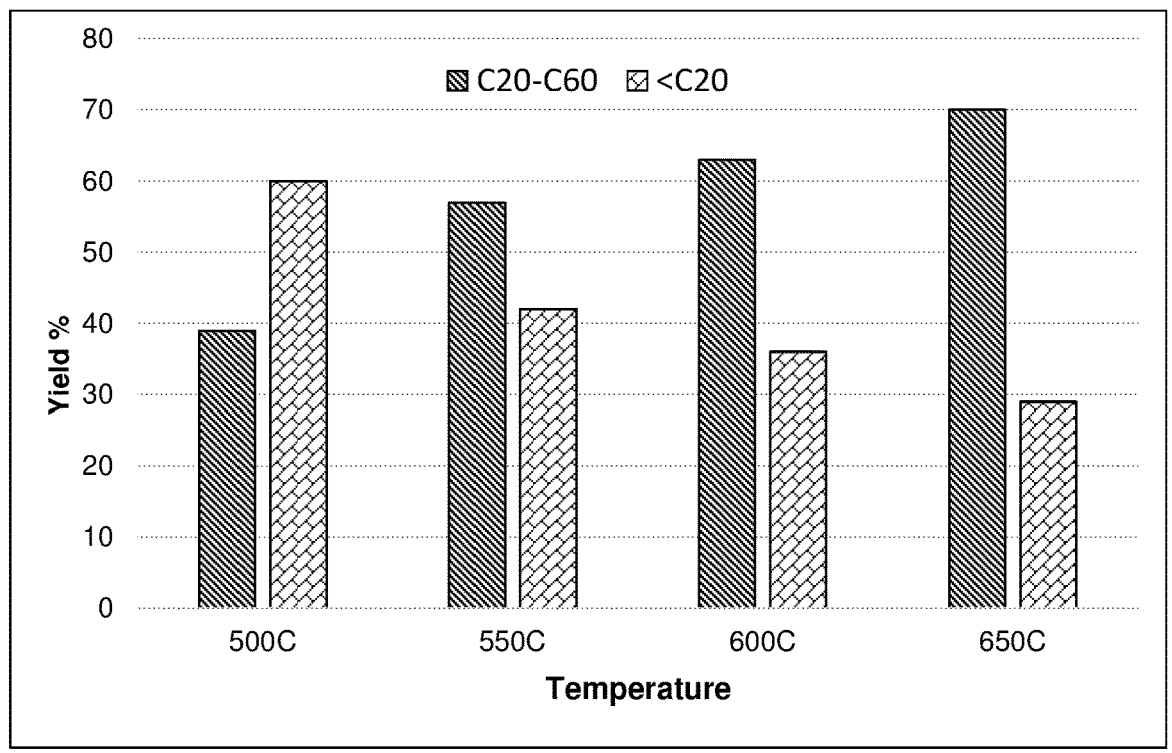
Figure 11:
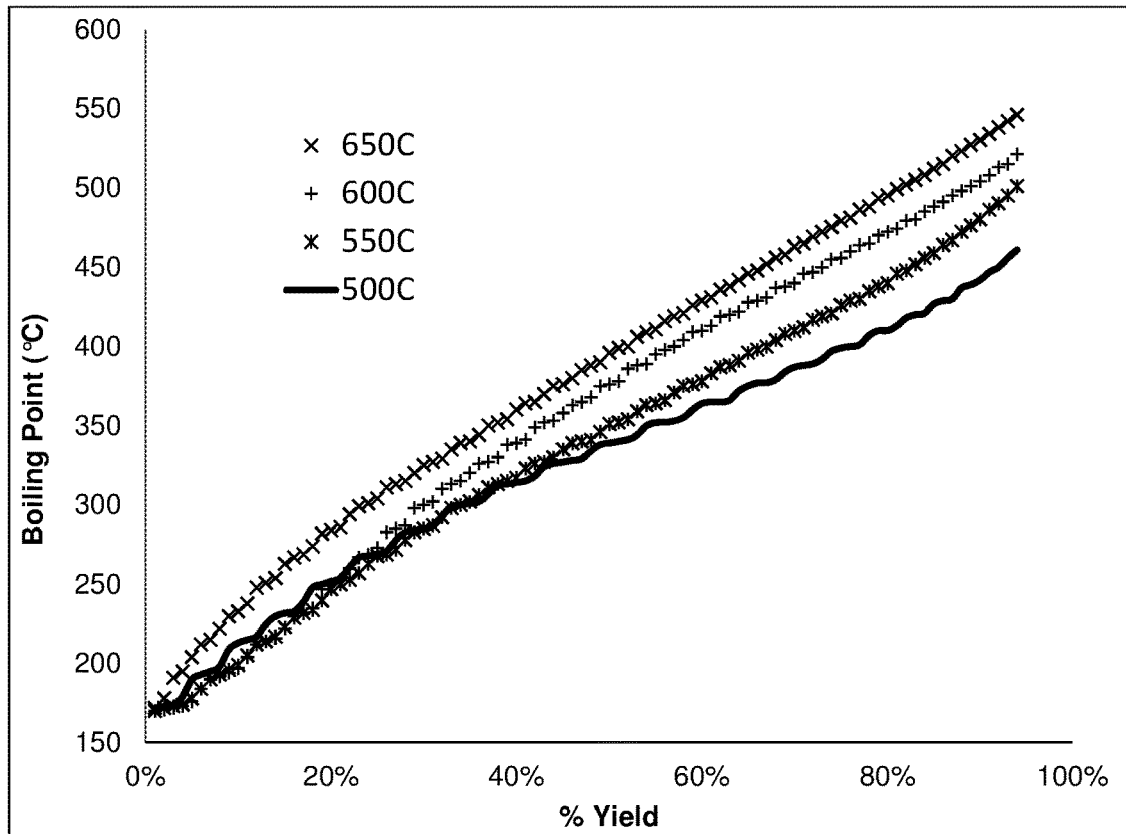
Figure 12:
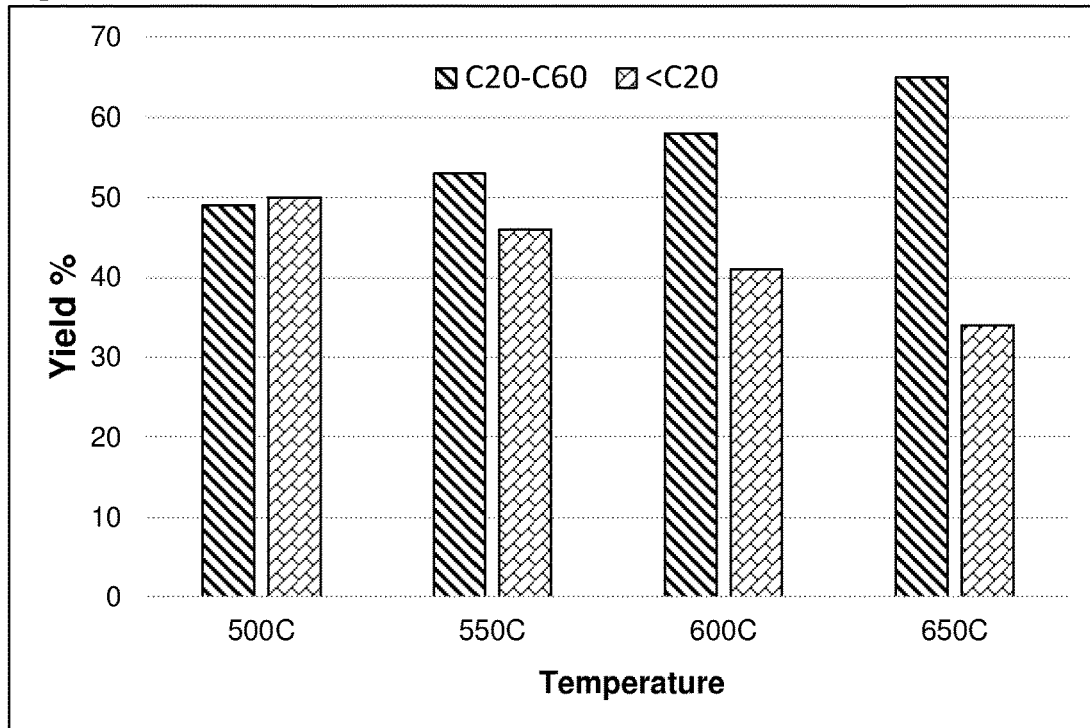

The present invention will now be illustrated by way of the following examples and with reference to the following figures, wherein:

FIG. 1: shows a schematic diagram of a vacuum pyrolysis process for producing a $C_{20}$ to $C_{60}$ wax as part of the process of the present invention including a multistage condensation according to preferred embodiments;

FIG. 2: shows a schematic diagram showing fractionation and downstream processing of the $C_{20}$ to $C_{60}$ wax fraction to produce a lubricant base stock as part of the process of the present invention;

FIG. 3: shows a plot illustrating the effect of pressure in the pyrolysis reactor on the thermal decomposition product distribution from pyrolysis of polypropylene in terms of boiling point of constituents;

FIG. 4: shows a bar graph illustrating the effect of pressure in the pyrolysis reactor in the pyrolysis of polypropylene on the $C_{20}$ to $C_{60}$ fraction yield;

FIG. 5: shows a plot illustrating the effect of pressure in the pyrolysis reactor on the thermal decomposition product distribution from pyrolysis of polyethylene in terms of boiling point of constituents;

FIG. 6: shows a bar graph illustrating the effect of pressure in the pyrolysis reactor in the pyrolysis of polyethylene on the $C_{20}$ to $C_{60}$ fraction yield;

FIG. 7: shows a plot illustrating the effect of pressure in the pyrolysis reactor on the thermal decomposition product distribution from pyrolysis of a polyethylene/polypropylene blend in terms of boiling point of constituents;

FIG. 8: shows a bar graph illustrating the effect of pressure in the pyrolysis reactor in the pyrolysis of a polyethylene/polypropylene blend on the $C_{20}$ to $C_{60}$ fraction yield;

FIG. 9: shows a plot illustrating the effect of temperature in the pyrolysis reactor on the thermal decomposition product distribution from pyrolysis of polypropylene in terms of boiling point of constituents;

FIG. 10: shows a bar graph illustrating the effect of temperature in the pyrolysis reactor in the pyrolysis of polypropylene on the $C_{20}$ to $C_{60}$ fraction yield;

FIG. 11: shows a plot illustrating the effect of temperature in the pyrolysis reactor on the thermal decomposition product distribution from pyrolysis of polyethylene in terms of boiling point of constituents; and FIG. 12: shows a bar graph illustrating the effect of pressure in the pyrolysis reactor in the pyrolysis of polyethylene on the $C_{20}$ to $C_{60}$ fraction yield.

With reference to FIG. 1, a plastic polyolefin polymer having a weight ratio of polyethylene to polypropylene of from 60:40 to 90:10 is supplied to extruder (E1) from a hopper (not shown). The extruder (E1), which in this instance is heated, produces a molten stream of plastic polyolefin polymer (101) which is fed to a vacuum pyrolysis reactor (R1) and the molten feed enters the thermal decomposition zone of the reactor (R1). The reactor (R1) is operated at sub-atmospheric conditions and at a temperature to give rise to thermal decomposition of the molten plastic polyolefin polymer, thereby producing pyrolysis vapours.

The configuration shown in FIG. 1 includes three condensation stages (C1, C2, C3) exemplifying a fractional condensation process according to some of the preferred embodiments. As will be appreciated, the multistage condensation may be operated with only two condensation stages, or more than three condensation stages, if desired. These pyrolysis vapours produced in the reactor, which may be in the form of an aerosol in which liquid thermal decomposition products are entrained therein, rapidly exit the pyrolysis reactor via an outlet, and the stream of pyrolysis vapours (102) is fed to a first condensation stage (C1). The first condensation stage (C1) is preferably cooled by means of a circulating liquid coolant, for example water. At least partial condensation of pyrolysis vapours occurs in the first condensation stage (C1), thereby producing an amount of liquid condensate, in addition to any liquid thermal decomposition product already present. First condensation stage (C1) includes a collection vessel to hold liquid condensate and liquid thermal decomposition product such that substantially only remaining pyrolysis vapours are fed to the second condensation stage (C2) in stream (103). The condensed product may be extracted from the collection vessel of the first condensation stage as stream (109) via an outlet. Stream (109) comprises the $C_{20}$ to $C_{60}$ wax fraction, together with any lighter and/or heavier fractions of the condensed thermal decomposition products. A stream (103), containing remaining pyrolysis vapours, exits the first condensation stage (C1) and is fed to a second condensation stage (C$_2$).

Second condensation stage (C2) condenses pyrolysis vapours that have not been condensed in the first condensation stage (C1). The second condensation stage (C2) is preferably cooled by means of a circulating liquid coolant, for example water, which is at a colder temperature than that of the coolant in the first condensation stage (C1). Condensation of at least a portion of the remaining pyrolysis vapours occurs in the second condensation stage (C2), which may comprise a collection vessel for holding the condensate. The condensed product may be extracted from a collection vessel of the second condensation stage as stream (110) via an outlet. Stream (110) primarily comprises lighter fractions of the condensed thermal decomposition products, for example in the naphtha and/or diesel boiling ranges. This light fraction may be conveniently used as fuel source for heating the pyrolysis reactor.

Remaining pyrolysis vapours are carried in stream (104) and fed to the third and final condensation stage (C3) shown in FIG. 1. However, as the skilled person will be aware, additional condensers can also be integrated into the series of the multistage condensation, which may be of use as a means for improved separation of pyrolysis products as part of a fractional condensation. The third condensation stage (C3) is preferably cooled by means of a circulating liquid coolant, for example water or glycol, which is at a colder temperature than that of the coolant in the second condensation stage (C2), or the preceding condensation stage if more than three condensation stages are used. Condensation of residual pyrolysis vapours occurs in the third condensation stage (C3), which may comprise a collection vessel for holding the condensate. The condensed product may be extracted from a collection vessel of the third condensation stage as stream (111) via an outlet. Stream (111) comprises the lightest fractions of the condensed thermal decomposition products. This lightest fraction may also be conveniently used as fuel source for heating the pyrolysis reactor.

Any non-condensable gas that is present is carried in stream (105) and may ultimately come into contact with variable speed vacuum pump (V). However, as the skilled person will appreciate, the presence of any pyrolysis vapours is preferably kept to a minimum in this stream and preferably completely removed by means of the final condensation stage. Nevertheless, the vacuum may be configured to accommodate various degrees of non-condensable gases being present in the stream which exits the final condensation stage.

FIG. 2 illustrates downstream processing of the $C_{20}$ to $C_{60}$ wax fraction. In particular, the stream (109) is fed to a fractional distillation column (F) where a stream (202) comprising substantially only a $C_{20}$ to $C_{60}$ wax fraction is produced together with a waste stream (210), which may be either used as a fuel source for the pyrolysis reactor or heavier fractions of this stream may be recycled to the pyrolysis reaction. Stream (202), comprising substantially no heteroatoms, is fed to a hydroisomerization reactor (HI) which is operated under hydroisomerization conditions in the presence of hydrogen and a bifunctional hydroisomerization catalyst. A stream (203) comprising a lubricant base stock exits the hydroisomerization reactor (HI), is optionally fractionated (not shown) before being fed into solvent dewaxing unit (DW) where any residual wax is removed. Product lubricant base stock (204) is thus obtained having both high viscosity index and low pour point which may be blended to form a commercially usable lubricant composition.

EXAMPLES

Preparation of Plastic Feedstock

Pelletized samples of polyethylene (PE) and polypropylene (PP) were obtained from ADN Materials Ltd. In each of the experiments below, samples of PE, PP or a combination thereof were first pre-melted at 400° C. in a quartz tube reaction vessel under atmospheric pressure for at least 10 minutes to provide a homogeneous molten material.

General Vacuum Pyrolysis Method 10 g of molten plastic sample was provided in a quartz tube reaction vessel of 24 mm outer diameter and 150 mm length. The reaction vessel was located inside a Carbolite® tubular furnace of 300 mm length and 25 mm diameter with a borosilicate glass still head fitted to the top of the quartz tube, which was in turn connected to a distillation condenser and 200 ml 2-neck round bottomed cooled collector flask. The distillation condenser was temperature controlled by means of circulating oil at a temperature of 80° C. The collector flask was cooled by acetone/dry ice bath (−78° C.) and connected to Buchi Rotavapor® membrane pump equipped with a digital vacuum controller.

Pyrolysis of the molten plastic sample began after applying the vacuum to establish sub-atmospheric pressure and increasing the heating to pyrolysis temperature. Temperature and pressure conditions were thereafter maintained for one hour, after which the pyrolysis reaction was complete and no further effluent from the reaction vessel was observed. A condensate product was collected in the collector flask comprising the wax product.

Example 1

The above general procedure for pyrolysis was followed for a series of four experiments using 10 g samples of the same propylene feedstock. Pyrolysis temperature was set at 550° C. and four different reaction pressures were adopted: i) 10 kPa; ii) 30 kPa; iii) 50 kPa; and iv) 70 kPa.

The collected effluent from the pyrolysis reaction (excluding uncondensable gases) for each experiment was analysed by SimDist GC chromatography in order to determine the composition of the product according to boiling point and carbon number. The results showing the product distribution based on boiling point are represented graphically in FIG. 3 whilst the results showing the product distribution based on carbon number are provided in Table A below and represented graphically in FIG. 4.

TABLE A

|  | Pyrolysis pressure | | | |
| --- | --- | --- | --- | --- |
|  | 10 kPa | 30 kPa | 50 kPa | 70 kPa |
| $C_{20}$-$C_{60}$ (%) | 73 | 57 | 52 | 37 |
| <$C_{20}$ (%) | 27 | 43 | 48 | 63 |

FIG. 3 generally illustrates the trend that as pressure inside the pyrolysis reactor decreases, the boiling point of the constituents of the thermal decomposition product obtained is increased. The results in Table A (as also illustrated in FIG. 4) are consistent in that they show that the amount of higher boiling point $C_{20}$-$C_{60}$ fraction is greatest at lowest pressure. This is believed to relate to lowering of vapour residence time in the pyrolysis reactor as pressure decreases which minimises secondary cracking reactions so that the thermal decomposition product has higher carbon number and therefore higher boiling point. The results of Example 1 also demonstrate that pressure conditions of the pyrolysis can be adjusted in order to increase the proportion of $C_{20}$-$C_{60}$ wax fraction that is produced.

Example 2

The series of experiments according to Example 1 was repeated except that samples of the same polyethylene feedstock were used in place of polypropylene.

The collected effluent from the pyrolysis reaction (excluding uncondensable gases) for each experiment was analysed by SimDist GC chromatography in order to determine the composition of the product according to boiling point and carbon number. The results showing the product distribution based on boiling point are represented graphically in FIG. 5 whilst the results showing the product distribution based on carbon number are provided in Table B below and represented graphically in FIG. 6.

TABLE B

|  | Pyrolysis pressure | | | |
| --- | --- | --- | --- | --- |
|  | 10 kPa | 30 kPa | 50 kPa | 70 kPa |
| $C_{20}$-$C_{60}$ (%) | 74 | 57 | 47 | 29 |
| <$C_{20}$ (%) | 26 | 43 | 53 | 71 |

FIGS. 5 and 6 illustrate the same trends as observed for the polypropylene experiments according to Example 1 and these results also demonstrate that pressure conditions of the pyrolysis can be adjusted in order to increase the proportion of $C_{20}$-$C_{60}$ wax fraction that is produced.

Example 3

The above general procedure for pyrolysis was followed for a series of three experiments using 10 g samples of the same 50:50 mixture by weight of polyethylene and polypropylene feedstock. Pyrolysis temperature was set at 550° C. and three different reaction pressures were adopted: i) 10 kPa; ii) 30 kPa; and iii) 70 kPa.

The collected effluent from the pyrolysis reaction (excluding uncondensable gases) for each experiment was analysed by SimDist GC chromatography in order to determine the composition of the product according to boiling point and carbon number. The results showing the product distribution based on boiling point are represented graphically in FIG. 7 whilst the results showing the product distribution based on carbon number are provided in Table C below and represented graphically in FIG. 8.

TABLE C

|  | Pyrolysis pressure | | |
| --- | --- | --- | --- |
|  | 10 kPa | 30 kPa | 70 kPa |
| $C_{20}$-$C_{60}$ (%) | 78 | 55 | 28 |
| <$C_{20}$ (%) | 21 | 44 | 71 |

FIGS. 7 and 8 illustrate the same trends as observed for the polypropylene experiments according to Example 1 and the polyethylene experiments of Example 2 and these results also demonstrate that pressure conditions of the pyrolysis can be adjusted in order to increase the proportion of $C_{20}$-$C_{60}$ wax fraction that is produced in a mixed blend of plastic feed.

Example 4

The above general procedure for pyrolysis was followed for a series of four experiments using 10 g samples of the same propylene feedstock. Pyrolysis pressure was set at 30 kPa and four different pyrolysis temperatures were adopted: i) 500° C.; ii); 550° C. iii) 600° C.; and iv) 650° C.

The collected effluent from the pyrolysis reaction (excluding uncondensable gases) for each experiment was analysed by SimDist GC chromatography in order to determine the composition of the product according to boiling point and carbon number. The results showing the product distribution based on boiling point are represented graphically in FIG. 9 whilst the results showing the product distribution based on carbon number are provided in Table D below and represented graphically in FIG. 10.

TABLE D

| | Pyrolysis Temperature | | | |
|---|---|---|---|---|
| | 500° C. | 550° C. | 600° C. | 650° C. |
| $C_{20}$-$C_{60}$ (%) | 39 | 57 | 63 | 70 |
| <$C_{20}$ (%) | 60 | 42 | 36 | 29 |

FIG. 9 generally illustrates the trend that as temperature inside the pyrolysis reactor increases, the boiling point of the constituents of the thermal decomposition product obtained is increased. The results in Table D (as also illustrated in FIG. 10) are consistent in that they show that the amount of higher boiling point $C_{20}$-$C_{60}$ fraction is greatest at highest temperature. This is a consequence of an increase in the volatility of higher boiling (higher carbon number) components inside the pyrolysis reactor as the pyrolysis temperature increases coupled with the low vapour residence time in the pyrolysis reactor, which minimises secondary cracking reactions associated with these higher boiling point components.

The results of Example 4 also demonstrate that temperature conditions of the pyrolysis can be adjusted in order to increase the proportion of $C_{20}$-$C_{60}$ wax fraction that is produced.

Example 5

The series of experiments according to Example 4 was repeated except that samples of the same polyethylene feedstock were used in place of polypropylene.

The collected effluent from the pyrolysis reaction (excluding uncondensable gases) for each experiment was analysed by SimDist GC chromatography in order to determine the composition of the product according to boiling point and carbon number. The results showing the product distribution based on boiling point are represented graphically in FIG. 11 whilst the results showing the product distribution based on carbon number are provided in Table E below and represented graphically in FIG. 12.

TABLE E

| | Pyrolysis Temperature | | | |
|---|---|---|---|---|
| | 500° C. | 550° C. | 600° C. | 650° C. |
| $C_{20}$-$C_{60}$ (%) | 49 | 53 | 58 | 65 |
| <$C_{20}$ (%) | 50 | 46 | 41 | 34 |

FIGS. 11 and 12 illustrate the same trends as observed for the polypropylene experiments according to Example 4 and these results also demonstrate that temperature conditions of the pyrolysis can be adjusted in order to increase the proportion of $C_{20}$-$C_{60}$ wax fraction that is produced.

Comparison of the results in Tables D and E shows that increasing temperature has a greater effect on the proportion of $C_{20}$-$C_{60}$ wax produced for polypropylene (Table D) than for polyethylene (Table E). In this way, by using a mixed feed comprising polypropylene and polyethylene, an increased benefit may be obtained by operating the pyrolysis at high temperature in terms of yield of the $C_{20}$-$C_{60}$ fraction which may be obtained, whilst simultaneously retaining the benefits associated with the properties of the wax resulting from the presence of both polypropylene and polyethylene (e.g. in terms of chain branching and viscosity).

General Vacuum Pyrolysis Method for Scaled-Up Reactions

Pelletized samples of polyethylene (PE) and polypropylene (PP) were obtained from ADN Materials Ltd. as for Examples 1 to 5.

The feedstock material is loaded into a pyrolysis reactor vessel which is then sealed. Nitrogen ($N_2$) gas is used to purge the reactor, before application of a vacuum. Three condensers are set to their respective temperatures. Condenser 1 is cooled using a Julabo with ethylene glycol/water to ca. −10° C. Condenser 2 is cooled using ethylene glycol and dry ice to ca. −15° C. Condenser 3 is cooled using dry ice to −78° C.

The pyrolysis reactor vessel is heated to 275° C., held at this temperature for 1 hour to pre-melt the feedstock before being heated to the desired pyrolysis temperature. The pyrolysis reactor vessel is held at this temperature until the reaction is completed. The reaction was monitored by four temperature probes, three of which are in the reactor vessel and one of which is positioned for measuring the temperature of the vapours coming out of the vessel. The pyrolysis reactor vessel was heated using a heating source comprising 2 heat belts surrounding the vessel. Pyrolysis temperatures referred to hereafter relate to the set temperature of the heating source. Temperature measurements obtained from probes inside the reaction vessel gradually increase to reach the heating source temperature.

In general, the reaction products comprise various hydrocarbon pyrolysis products collected in the condensers, char remaining in the reaction vessel and gases (e.g. hydrocarbons having a boiling point below room temperature), which are too volatile to be collected in the condensers. The products of each reaction in the first condenser were analysed by simulated distillation chromatography (SimDist, ASTM D6352). The products found in condensers 2 and 3 were typically found to be boiling below the minimum observable in the SimDist method, indicating they likely consist of hydrocarbon chains between 5 and 9 carbons in length ($C_5$-$C_9$).

Example 6

The above scaled-up general procedure was followed for two experiments using a 67:33 HDPE:PP by weight feed. Reaction pressure was set at 350 mbar and two different reaction temperatures were adopted: i) 450° C. and ii) 600° C.

The collected effluent from the pyrolysis reaction in the first condenser for each experiment was analysed by SimDist GC chromatography in order to determine the composition of the product according to boiling point and carbon number. The results showing the product distribution in terms of the different fractions collected are shown in Table F below, whilst the results showing the product distribution based on carbon number for the first condenser are provided in Table G below.

TABLE F

| | 450° C. | | 600° C. | |
|---|---|---|---|---|
| | (kg) | (mass %) | (kg) | (mass %) |
| Feedstock in | 12.00 | 100.00 | 12.00 | 100.00 |
| Condenser 1 | 10.52 | 87.67 | 9.20 | 76.67 |
| Condensers 2 + 3 | 1.19 | 9.92 | 1.51 | 12.58 |
| Char | 0.19 | 1.58 | 0.87 | 7.25 |
| Unaccounted (gases) | 0.10 | 0.83 | 0.42 | 3.50 |

TABLE G

|  | 450° C. (mass %) | 600° C. (mass %) |
|---|---|---|
| $C_{10}$-$C_{25}$ | 67 | 51 |
| $C_{25}$-$C_{31}$ | 13 | 18 |
| $C_{31}$-$C_{36}$ | 8 | 12 |
| $C_{36+}$ | 12 | 19 |
| $C_{20+}$ | 49 | 67 |

The data in Tables F and G illustrate that at higher reaction temperatures an increased proportion of $C_{20+}$ waxes are produced. This is consistent with the data in Tables D and E, which show the same trend. In addition to the increased proportion of heavier waxes at higher temperature, Table F shows that a larger proportion of lighter hydrocarbons collected in the second and third condensers are also produced at 600° C. compared to 450° C. Thus, at higher reaction temperatures, not only are more heavy waxes produced, but there is also a more defined split in the distribution between heavy and light hydrocarbons. This leads to an increase in the amount of product collected in the second and third condensers. In this way, the increased separation provided by a multistage condensation is particularly effective in combination with a higher pyrolysis temperature, i.e. there is a certain synergy between the use of higher pyrolysis temperature and the provision of a multi-stage condensation in a process for isolating a $C_{20}$-$C_{60}$ wax from the pyrolysis process. It will be understood that convenient separation of lighter fractions during condensation may simplify or eliminate the downstream distillation requirements.

Example 7

The above scaled-up general procedure was followed for two experiments using a pure HDPE feed. Reaction pressure was set at 350 mbar and two different reaction temperatures were adopted: i) 450° C. and ii) 600° C.

The collected effluent from the pyrolysis reaction in the first condenser for each experiment was analysed by SimDist GC chromatography in order to determine the composition of the product according to boiling point and carbon number. The results showing the product distribution based on carbon number for hydrocarbons collected in the first condenser are provided in Table H below.

TABLE H

|  | 450° C. (mass %) | 600° C. (mass %) |
|---|---|---|
| $C_{10}$-$C_{25}$ | 49 | 37 |
| $C_{25}$-$C_{31}$ | 19 | 13 |
| $C_{31}$-$C_{36}$ | 12 | 10 |
| $C_{36+}$ | 20 | 40 |
| $C_{20+}$ | 61 | 69 |

The data in Table H illustrate that at higher reaction temperatures an increased proportion of $C_{20+}$ waxes are produced. This is consistent with the data in Tables D, E and G, which show the same trend.

Furthermore, the data in Table H also show that increasing temperature has a greater effect on the proportion of $C_{20}$-$C_{60}$ wax produced for these polypropylene containing feeds (Tables D and G) than for pure polyethylene feeds (Tables E and H). In this way, by using a mixed feed comprising polypropylene and polyethylene, greater benefits in terms of yield of the $C_{20}$-$C_{60}$ fraction at higher temperature may be obtained whilst also retaining the benefits of having a mixture of polypropylene and polyethylene in the feed in terms of the properties of the resulting wax. Even at temperatures where ultimately less of the $C_{20+}$ fraction is produced for PP containing feeds in comparison to PE feeds, higher temperatures will mitigate the loss whilst retaining the benefits of including some branching in the waxes. Thus, there is a certain synergy between the use of higher pyrolysis temperature and the use of a certain proportion of polypropylene in the feed for isolating a $C_{20}$-$C_{60}$ wax from the pyrolysis process with particularly beneficial properties.

Example 8

The above scaled-up general procedure was followed for three experiments using an 80:20 PE:PP by weight feed. Reaction pressure was set at 350 mbar and three different reaction temperatures were adopted: i) 450° C., ii) 525° C. and iii) 600° C.

The collected effluent from the pyrolysis reaction in the first condenser for each experiment was analysed by SimDist GC chromatography in order to determine the composition of the product according to boiling point and carbon number. The results showing the product distribution in terms of the different fractions collected are shown in Table I below, whilst the results showing the product distribution based on carbon number for the first condenser are provided in Table K below.

TABLE I

|  | 450° C. | | 525° C. | | 600° C. | |
|---|---|---|---|---|---|---|
|  | (kg) | (mass %) | (kg) | (mass %) | (kg) | (mass %) |
| Feedstock in | 10.015 (8.005 + 2.010) | 100.00 | 10.000 (8.000 + 2.000) | 100.00 | 10.010 (8.005 + 2.005) | 100.00 |
| Condenser 1 | 7.67 | 76.59 | 7.575 | 75.75 | 7.200 | 71.29 |
| Condenser 2 + 3 | 0.46 | 4.59 | 0.695 | 6.95 | 0.815 | 8.07 |
| Char | 0.25 | 2.50 | 0.11 | 1.1 | 0.210 | 2.08 |
| Unaccounted | 1.635 | 16.33 | 1.62 | 16.2 | 2.21 | 18.56 |

TABLE K

|  | 450° C. (mass %) | 525° C. (mass %) | 600° C. (mass %) |
|---|---|---|---|
| $C_{10}$-$C_{25}$ | 55 | 55 | 42 |
| $C_{25}$-$C_{31}$ | 18 | 17 | 14 |
| $C_{31}$-$C_{36}$ | 11 | 11 | 16 |
| $C_{36+}$ | 16 | 17 | 28 |
| $C_{20+}$ | 63 | 62 | 69 |

The results in Tables K and I are consistent with the results in Tables F and G, showing that at higher pyrolysis temperatures there are larger proportions of heavier waxes produced, particularly the $C_{36+}$ fraction. As also seen in Table F, Table I also shows an increased amount of product collected in the second and third condensers at higher temperatures, suggesting a certain synergy in the use of a multistage condensation in combination with higher pyrolysis temperatures in obtaining efficient production and separation of the desirable wax fractions.

The invention claimed is:

1. A process for preparing a lubricant base stock from the thermal decomposition of plastic polyolefin polymer, the method comprising the steps of:
    i) introducing a feed comprising plastic polyolefin polymer into a thermal reaction zone of a vacuum pyrolysis reactor;
    ii) heating the plastic polyolefin polymer at a pressure of less than 50 kPa, wherein the temperature in the thermal reaction zone of the reactor is from 500° C. to 750° C., to induce thermal decomposition of the plastic polyolefin polymer and to form a thermal decomposition product effluent which comprises a major portion by weight of a $C_{20}$ to $C_{60}$ wax fraction;
    iii) condensing a vapor component of the thermal decomposition product effluent from the vacuum pyrolysis reactor; and
    iv) subjecting the $C_{20}$ to $C_{60}$ wax fraction of the thermal decomposition product to catalytic hydroisomerization in a hydroisomerization reactor in the presence of hydrogen to form the lubricant base stock,
    wherein the plastic polyolefin polymer comprises polyethylene and polypropylene in a polyethylene to polypropylene weight ratio of from 60:40 to 90:10, and
    wherein the feed to the vacuum pyrolysis reactor comprises less than 1.0 wt. % of halogenated polymers.

2. A process according to claim 1, wherein the plastic polyolefin polymer is introduced into the pyrolysis reactor by means of an extruder.

3. A process according to claim 1, wherein the process includes at least one member of a group consisting of: the temperature in the thermal reaction zone of the reactor is from 525 to 650° C., and the pressure in the thermal reaction zone of the vacuum pyrolysis reactor is less than 30 kPa absolute.

4. A process according to claim 1 wherein the process includes at least one member of a group consisting of:
    the plastic polyolefin polymer comprises or consists essentially of used or waste plastic, and
    an optical sorting process is utilized to obtain plastic polyolefin polymer of the desired composition, wherein the optical sorting process is near-Infrared (NIR) absorption spectroscopy, camera color sorters, or X-ray fluorescence.

5. A process according to claim 1, wherein the plastic polyolefin polymer comprises high-density polyethylene (HDPE), low-density polyethylene (LDPE), linear low-density polyethylene (LLDPE) or a mixture thereof.

6. A process according to claim 1, wherein the vapour component of the thermal decomposition product effluent is condensed in step iii) in a multistage condensation comprising a plurality of condensation stages connected in series.

7. A process according to claim 6, wherein the process includes at least one member of a group consisting of:
    a first condensation stage is operated as a direct liquid quench, and
    the majority of the $C_{20}$ to $C_{60}$ wax fraction is collected in a collection vessel of the first condensation stage of the series.

8. A process according to claim 1, wherein the process further comprises a step iii-b) of fractionating the thermal decomposition product effluent to obtain a $C_{20}$ to $C_{60}$ wax fraction substantially free of lighter and/or heavier thermal decomposition products.

9. A process according to claim 8, wherein a lighter boiling point fraction separated from the $C_{20}$ to $C_{60}$ wax fraction in step iii-b) is used as a source of fuel for heating the pyrolysis reactor.

10. A process according to claim 1, wherein the process includes at least one member of a group consisting of:
    the $C_{20}$ to $C_{60}$ wax fraction comprises a mixture of paraffins and olefins, and
    the $C_{20}$ to $C_{60}$ wax product comprises from 20 wt. % to 80 wt. % olefins.

11. A process according to claim 1, wherein the $C_{20}$ to $C_{60}$ wax fraction comprises at least 50 wt. % of at least one of: a $C_{25}$ to $C_{55}$ wax sub-fraction, a $C_{25}$ to $C_{50}$ wax sub-fraction, a $C_{30}$ to $C_{45}$ wax sub-fraction, a $C_{30}$ to $C_{40}$ wax sub-fraction, or a $C_{30}$ to $C_{35}$ wax sub-fraction.

12. A process according to claim 1, wherein the pyrolysis reaction is conducted in the absence of a catalyst.

13. A process according to claim 1, wherein the $C_{20}$ to $C_{60}$ wax fraction is subjected to a catalytic hydrotreatment prior to hydroisomerization.

14. A process according to claim 1, wherein no intermediate hydrotreatment is conducted on the $C_{20}$ to $C_{60}$ wax fraction obtained from the pyrolysis prior to hydroisomerization.

15. A process according to claim 14, wherein the $C_{20}$ to $C_{60}$ wax fraction obtained from the pyrolysis contains less than 10 ppmw sulphur and less than 2 ppmw nitrogen.

16. A process according to claim 1, wherein the hydroisomerization catalyst is a bifunctional catalyst comprising a hydro/dehydrogenation metal selected from IUPAC Groups 8 to 10 and a porous solid acid component.

17. A process according to claim 16, wherein the process includes at least one member of a group consisting of:
    the IUPAC Group 8 to 10 metals are selected from Fe, Ru, Os, Co, Rh, Jr, Ni, Pd, Pt, and combinations thereof,
    the solid acid is selected from zeolite, silica-aluminophosphate, silica, alumina, silica-alumina or combinations thereof,
    the solid acid comprises pores of the 10-membered ring variety,
    the solid acid has an intermediate pore having a minimum pore opening diameter of 4.8 Å, and
    the solid acid is selected from ZSM-22, ZSM-23, ZSM-35, ZSM-48, ZSM-57, SAPO-11, MAPO-11, SM-3, SM-6, SSZ-32, ferrierite and combinations thereof.

18. A process according to claim 1, wherein the process includes at least one member of a group consisting of:
    the temperature in the hydroisomerization reactor is from 250° C. to 450° C., the temperature in the hydroisomerization reactor is from 200° C. to 400° C., the pressure in the hydroisomerization reactor is from 1.0 to 25 mPa absolute, the Liquid Hourly Space Velocity of the liquid wax fed to the hydroisomerization reactor per unit volume of catalyst per hour is in the range of from 0.1 to 12 h$^{-1}$, and a hydrogen-containing gas feed rate to the hydroisomerization reactor is such that the hydrogen to liquid wax ratio is from 100 to 1750 m$^3$/m$^3$.

19. A process according to claim 1, wherein the process includes at least one member of a group consisting of:
solvent dewaxing the lubricant base stock, and
blending the lubricant base stock with one or more lubricant additives to form a lubricant composition.

20. A process according to claim 1, wherein the process includes at least one member of a group consisting of:
the lubricant base stock has a viscosity index of 100 or greater as measured by ASTM Method D2270, and
the lubricant base stock is a Group III or Group III+base stock.

* * * * *